(12) United States Patent
Rard et al.

(10) Patent No.: US 12,396,432 B2
(45) Date of Patent: *Aug. 26, 2025

(54) TEAT PREPARATION SYSTEM

(71) Applicant: Robovine, LLC, Palo Alto, CA (US)

(72) Inventors: Roy L. Rard, Conway, WA (US); Ron L. Medeiros, Littlefield, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/407,038

(22) Filed: Jan. 8, 2024

(65) Prior Publication Data

US 2024/0147952 A1   May 9, 2024

Related U.S. Application Data

(63) Continuation-in-part of application No. 17/324,984, filed on May 19, 2021, now Pat. No. 11,864,530.

(51) Int. Cl.
*A01J 7/04*   (2006.01)

(52) U.S. Cl.
CPC ....................................... *A01J 7/04* (2013.01)

(58) Field of Classification Search
CPC ...... A01J 7/04; A01J 7/02; A01J 7/022; A01J 7/025

See application file for complete search history.

(56) References Cited

U.S. PATENT DOCUMENTS

| | | | |
|---|---|---|---|
| 6,302,058 B1 * | 10/2001 | Dahl | A01J 7/04 |
| | | | 119/14.47 |
| 10,945,406 B2 * | 3/2021 | Neal | A01J 7/04 |
| 2019/0133069 A1 * | 5/2019 | Stuessel | A01J 7/022 |

FOREIGN PATENT DOCUMENTS

WO   WO-2017071535 A1 *   5/2017 ............... A01J 7/04

* cited by examiner

*Primary Examiner* — Joshua D Huson
*Assistant Examiner* — Spencer T Callaway
(74) *Attorney, Agent, or Firm* — Dean A. Craine, P.S.

(57) ABSTRACT

A teat preparation apparatus to clean bovine teat before milking and then sanitize the teat after milking. The apparatus, which is connected to a control unit, includes a holder and a teat receiving body with high-pressure air, pre-dip, and post-dip ports. Inside the teat receiving body is a spray cylinder that forms two or three stacked, isolated raceways that communicate with the three ports so that air and the two solutions can be selectively-sprayed individually or together over a teat at different stages of operation. The holder may be attached a support arm integrated with a robotic system with a track parallel to a row of bovines to be milked. When used in a robotic system, two or more teat receiving bodies may be adjusted, enabling the spacing and orientation of each teat receiving body to be adjusted. Additionally, a deflection cap with an optional diffuser enhances functionality.

21 Claims, 30 Drawing Sheets

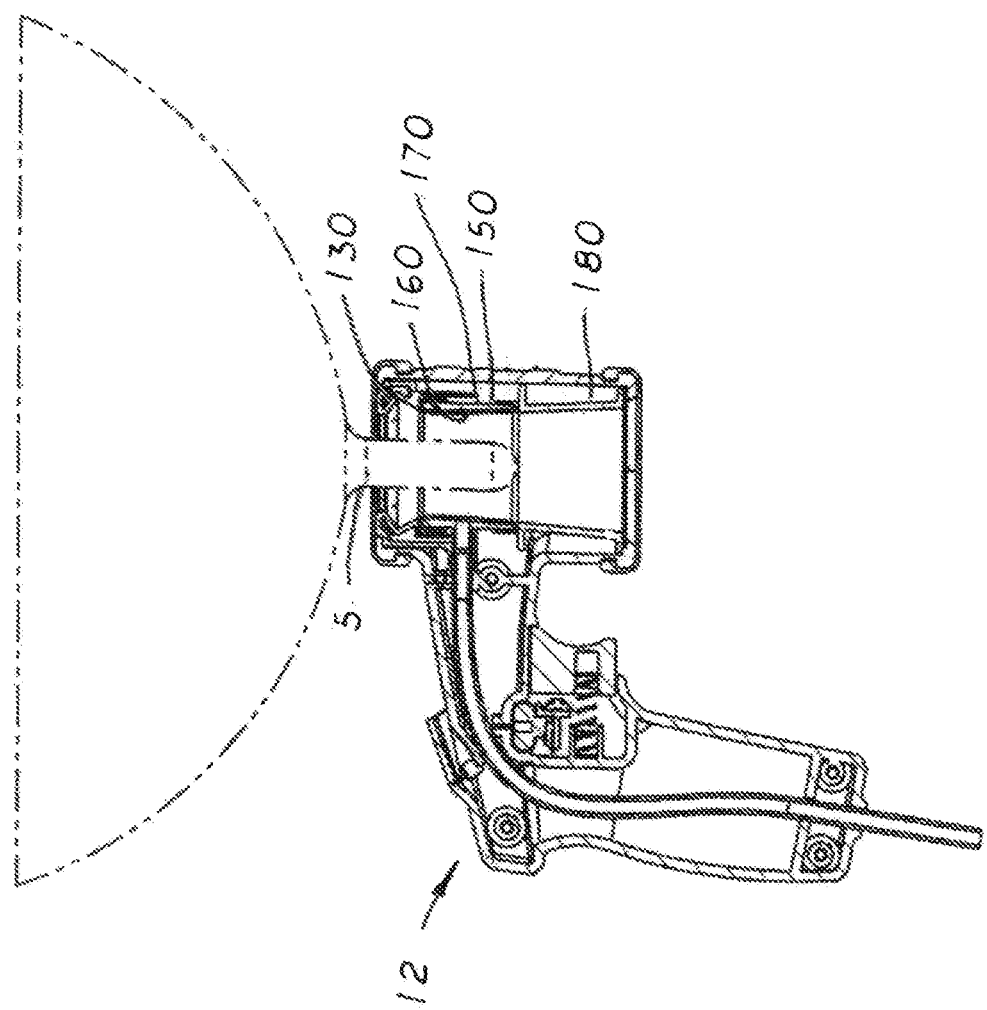

TEAT PREPARATION SYSTEM

REFERENCES TO RELATED APPLICATIONS

This continuation-in-part patent application is based on and claims the priority date benefit of the U.S. continuation-in-part patent application (application Ser. No. 17/324,984) filed on May 19, 2021, which is based on and claims the filing date benefit of the U.S. utility patent application (application Ser. No. 17/009,561) filled on Sep. 1, 2020, which is based on and claims the filing date benefit of U.S. provisional patent application 62/960,875 filed on Jan. 14, 2020.

BACKGROUND OF THE INVENTION

1. Field of the Invention

This invention pertains to devices that automatically clean, dry, and apply a post-dip solution to individual teats on a bovine.

2. Description of the Related Art

Dairy workers should follow good, hygienic milking procedures to ensure the milk collected is safe to consume. For example, each teat should be thoroughly cleaned before milking. The cleaning task is performed by a worker who stands on one side or behind the cow and applies a cleaning solution. The pre-dip solution is usually an aqueous mixture containing 0.5% iodine, hydrogen peroxide, chlorine dioxide, or a combination. After all teats have been cleaned with the pre-dip solution, the worker uses a dry towel to remove the pre-dip solution and any remaining dirt or debris. Hundreds of towels are used daily, a substantial burden to dairy operators.

Before milking, all teats are usually 'stripped' to stimulate oxytocin release. While washing and drying the teat may partially stimulate oxytocin release, the worker will sometimes manually squeeze and pull each teat downward to stimulate oxytocin release further. The amount of stimulation is dependent on the worker's skill and the amount of time spent manually squeezing and pulling the teats.

After milking, the worker manually applies a disinfecting solution, called a 'post-dip solution', to each teat. The post-dip solution contains a higher concentration of iodine and a thickening agent, making it more viscous than the pre-dip solution. The post-dip solution must be applied to the tip of each teat and given sufficient time to dry in place and form a protective layer.

Suppose the steps of applying and drying the pre-dip solution, stipping the teat, applying the post-dip solution, and allowing the post-dip solution to dry to form a protective layer are not completed. In that case, milk from the cow may be contaminated, and infection may occur.

It is well known to dairy farmers that the size and shapes of teats on a cow vary. It is also well known to dairy farmers that the amount of dried mud on a bovine's teats also varies. Variations in the sizes and shapes of the teats and the amount of dried mud on the teats make consistently cleaning the teats on all cows in a dairy farm challenging.

Because the worker must stand to one side or behind the cow to reach all of the teats, areas of the teats opposite the worker are challenging to reach. As a result, some areas on the teat are not treated with a pre-dip solution, dried, stripped, or treated with a post-dip solution.

What is needed is a teat preparation system that uses a single, lightweight handpiece that thoroughly cleans, evenly applies a pre-dip solution to each teat, removes excessive pre-dip solution from each teat, and eliminates the use of cloth or paper towels.

What is also needed is a teat preparation system that evenly applies a post-dip solution to the entire teat.

What is also needed is a teat preparation system that can be easily modified to strip the teat.

What is also needed is a teat preparation system that uses exchangeable components that enable different sizes and shapes of teats to be cleaned, sprayed with a pre-dip solution, dried, and sprayed with a post-dip solution.

What is also needed is a teat preparation system that allows the user to selectively adjust the operation of the handpiece to clean the teat when needed.

SUMMARY OF THE INVENTION

A teat preparation system automatically and selectively cleans the teats individually on a bovine with high-pressure air and a pre-dip solution that dries each teat without using towels after applying the pre-dip solution. The system then applies a post-dip solution to each teat after milking.

The system includes a holder connected to a control unit. In one embodiment, the holder is a compact, lightweight handpiece, and configured to be held and operated with one hand. The handpiece is connected to the control unit, made with durable components that stand up to rough use in a milking parlor. In another embodiment, the holder is a support arm in a robotic control system. In both embodiments, the control unit controls high-pressure air delivery, a pre-dip solution, and a post-dip solution to a teat receiving body. The holder positions the teat receiving body under a teat during use, and the control unit is activated. When the holder is a handpiece, a mode switch and a trigger are provided that allows the user to manually control the delivery of the high-pressure air, the pre-dip solution, and the post-dip solution from the control unit to the handpiece.

The teat receiving body includes a spray cylinder. A central bore configured to receive a teat is formed inside the spray cylinder. The central bore has a narrow top opening configured to receive and fit around a teat and a wide bottom opening through which high-pressure air and the pre-dip solution are discharged. The spray cylinder includes a wide upper section below the teat receiving body's top opening in which two or more nozzles are formed. The nozzles are arranged in a circular pattern on the inside surface of the spray cylinder. The spray cylinder is replaceable and exchangeable with different spray cylinders, central bores with different diameters, and two to three circular raceways. The sidewalls of the spray cylinders are configured to form two or more isolated circular raceways between the inside surface of the teat receiving body and the outside surface of the spray cylinder. The two or more sets of nozzles are located on the inside surfaces of the central bore adjacent to the raceways so that air, pres-dip solution or post-dip solution delivered to the raceways flow through the set of nozzles adjacent to the raceway.

The lower sidewalls of the spray cylinder below the lowest raceway diverge, creating a venturi when high-pressure air flows downward in the spray cylinder.

Loaded into the control unit's memory is a software program that controls the delivery of high-pressure air, pre-dip solution, and post-dip solution to the holder. The software program controls the sequence and release of high-pressure air, pre-dip solution and post-dip solution, and the time each is delivered to the teat receiving body. For example, after the pre-dip solution has been delivered to the teat receiving body for a predetermined amount of time and discontinued, the control unit continues to deliver high-pressure air to the teat receiving body to remove the excessive pre-dip solution from the teat. After a suitable amount of time, the high-pressure air delivery is discontinued. The teat receiving body is then removed from the teat.

After milking, the holder repositions the teat receiving body under the teat, and high-pressure air is selectively delivered. As mentioned above, a venturi is created in the spray cylinder that draws the teat into bottom opening in the spray cylinder. Once the teat is drawn into the bottom opening, the post-dip solution is then delivered to the handpiece. The high-pressure air is applied simultaneously with the post-dip solution to atomize the post-dip solution. After a predetermined amount of post-dip solution has been applied, the high-pressurized air is discontinued, and the application of the post-dip solution continues for a few seconds. The post-dip solution is then air-dried, forming a wet layer of post-dip solution over the entire teat. The teat receiving body is removed, and the post-dip solution can air dry.

In another embodiment, the holder may be a support arm integrated with a robotic arm control apparatus connected to the control unit. When the holder is a handpiece, the handpiece includes a set of internal conduits that connect to external conduits connected to storage containers that hold the high-pressured air, the pre-dip solution, and the post-dip solution. When the holder is integrated into a robotic arm control apparatus or when a holder is a handpiece, each storage container is coupled to a solenoid that connects to the control unit. The control unit includes a programmable logic controller (also called a PLC). A software program controls the order in which the solenoids are opened and how long each solenoid is opened and closed. The software program is programmable, enabling the operator to adjust when and how long the solenoids are activated.

The distal ends of the internal conduits in the handpiece or a support arm on a robotic unit connect to ports formed on the teat receiving body. In one embodiment, the distal ends of the conduits and the ports are horizontally aligned. In another embodiment, the distal ends of the conduits and the ports on the teat receiving body handpiece are vertically aligned, enabling an exchangeable teat-receiving body to be used. In this embodiment, the exchangeable teat receiving body is modified and configured to be used with a modified spray cylinder, respectively. The modified spray cylinder can be manufactured in different sizes, enabling the handpiece to be used with different teats.

In still another embodiment, a deflection cap may be integrally formed or attached to the lower edge of the teat receiving body or to the spray cylinder. The deflection cap curves downward and inward to a narrow apex. During use, the deflection cap redirects the high-pressure air, the pre-dip solution, and the post-dip solution inward to form a narrow stream. The user may manipulate the handpiece to redirect the high-pressure air stream, pre-dip solution, and post-dip solution in dirty, hard-to-reach areas. An optional diffuser and agitator may be used inside the deflection cap to enhance the distribution of the pre and post-dip solutions.

In another embodiment, the teat receiving body is modified to include an elastic bladder sleeve inside a rigid frame. The bladder frame fits into a modified spray cylinder configured for use in the teat receiving body. The bladder sleeve is configured to squeeze against the outside surface of a teat placed inside the teat receiving body. The bladder sleeve squeezes downward, milking-like, against the sides of the teat to strip the teat after the pre-dip solution application and the drying steps have been completed.

DESCRIPTION OF THE DRAWINGS

FIG. 17 is an end, sectional view of the spray cylinder taken along line 17-17 in

FIG. 13.

FIGS. 23, 24, and 25 are sequential, side elevational views of a stripping embodiment of the invention, including an expandable, elastic bladder sleeve.

DESCRIPTION OF THE PREFERRED EMBODIMENT(S)

Figure 1:
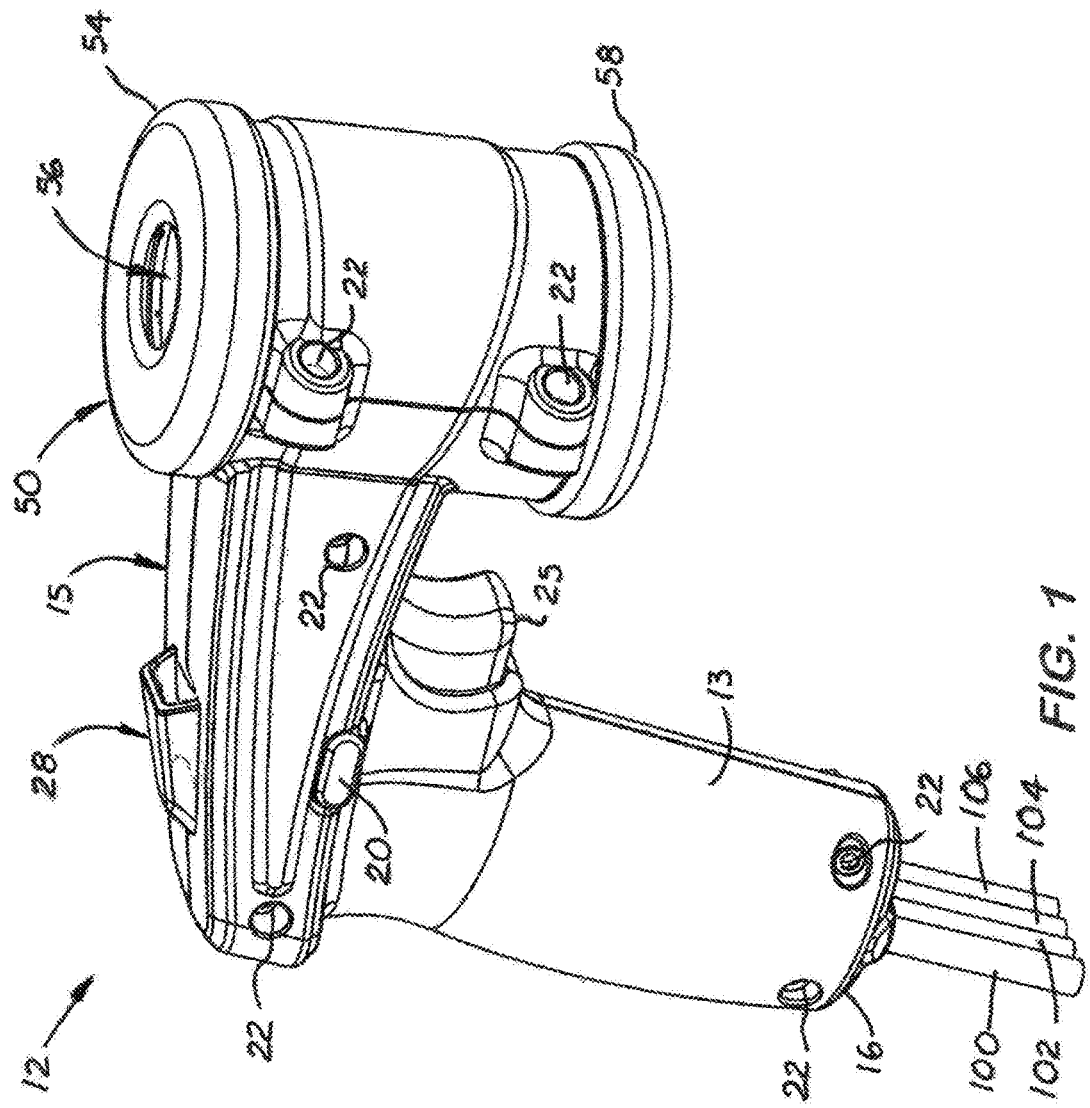
FIG. 1 illustrates the teat preparation system disclosed herein, which includes a handpiece connected to a control unit.
Figure 2:
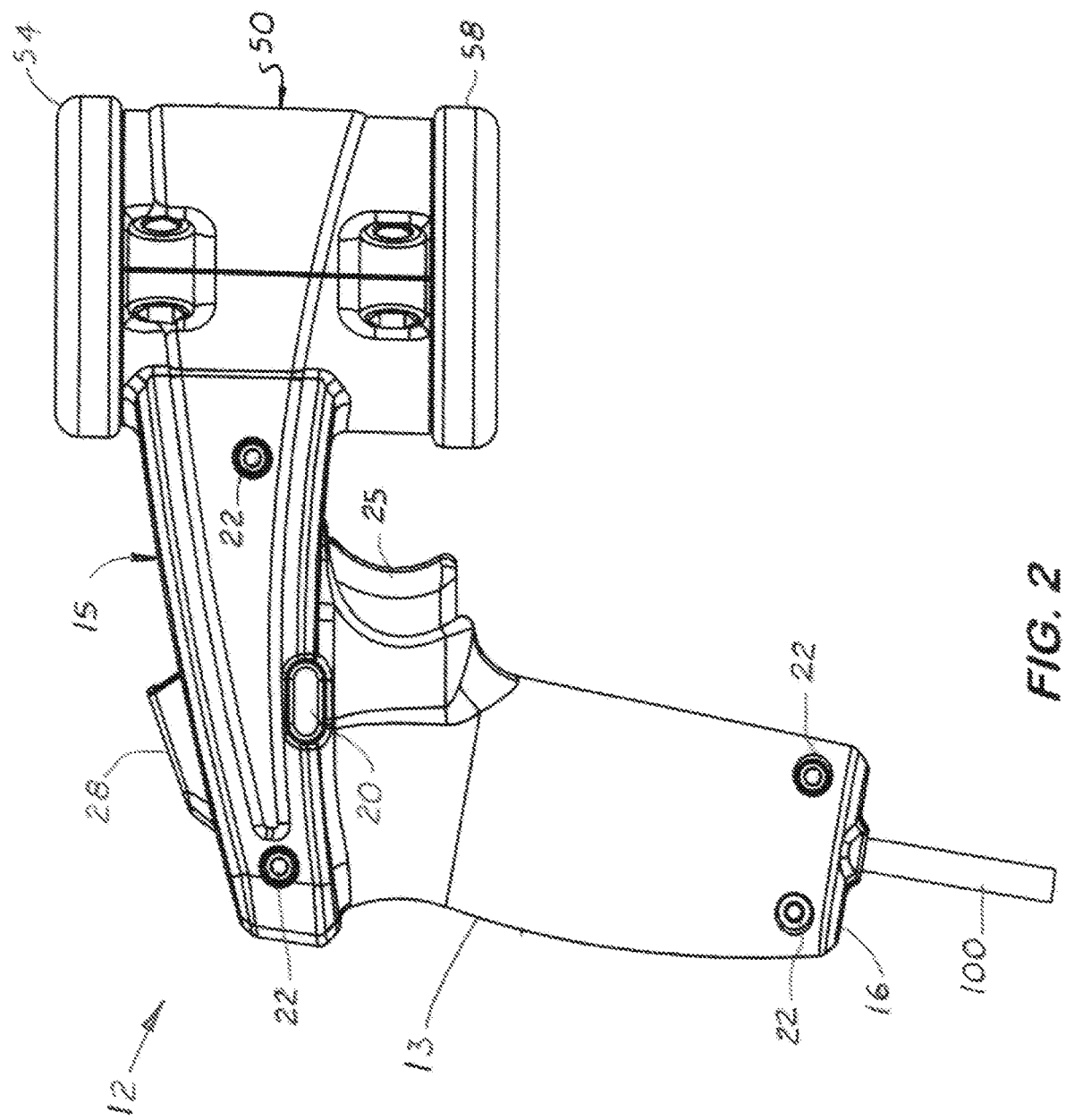
FIG. 2 is a side elevational view of the handpiece.
Figure 3:
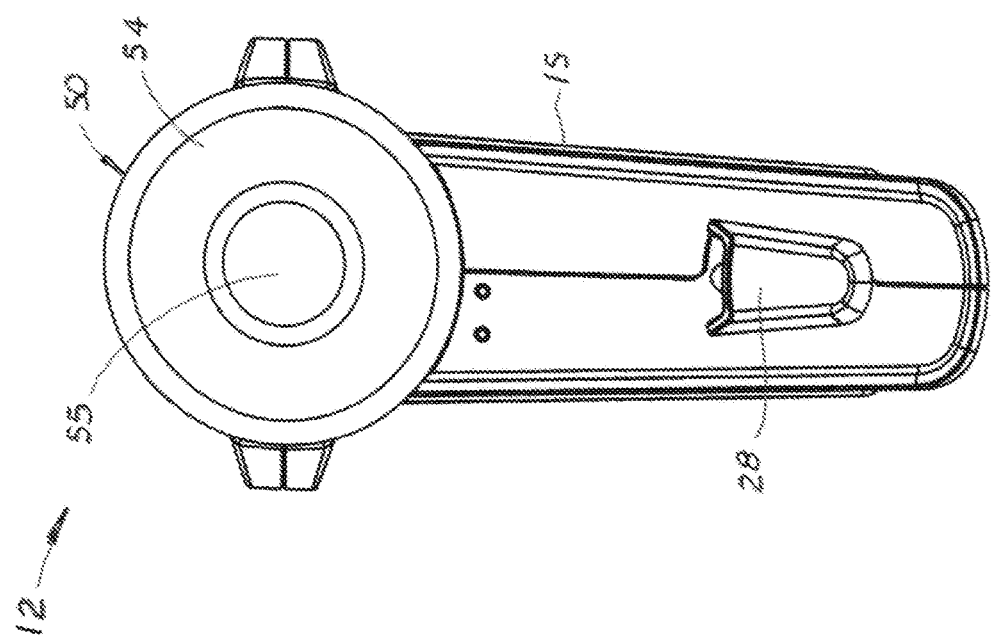
FIG. 3 is a top plan view of the handpiece.
Figure 4:
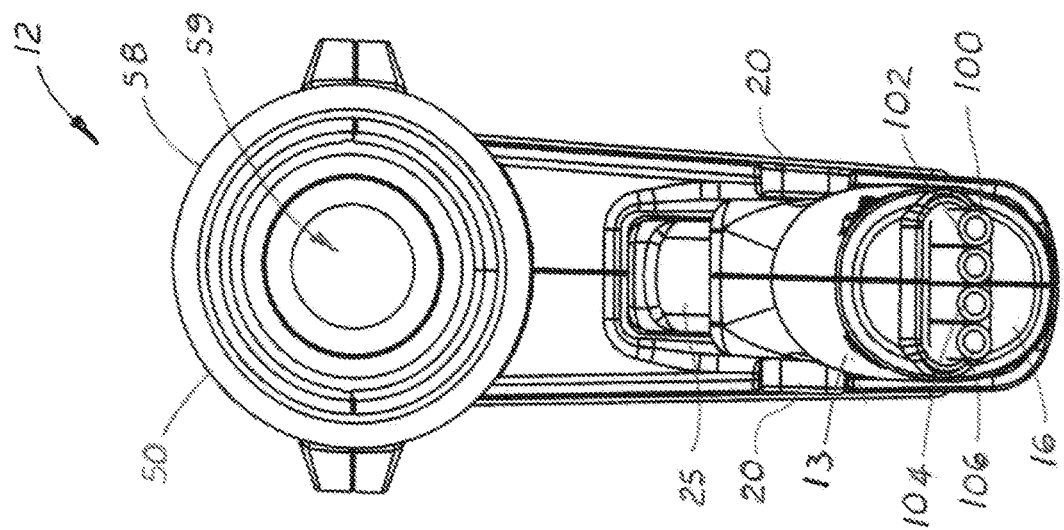
FIG. 4 is a bottom plan view of the handpiece.
Figure 5:
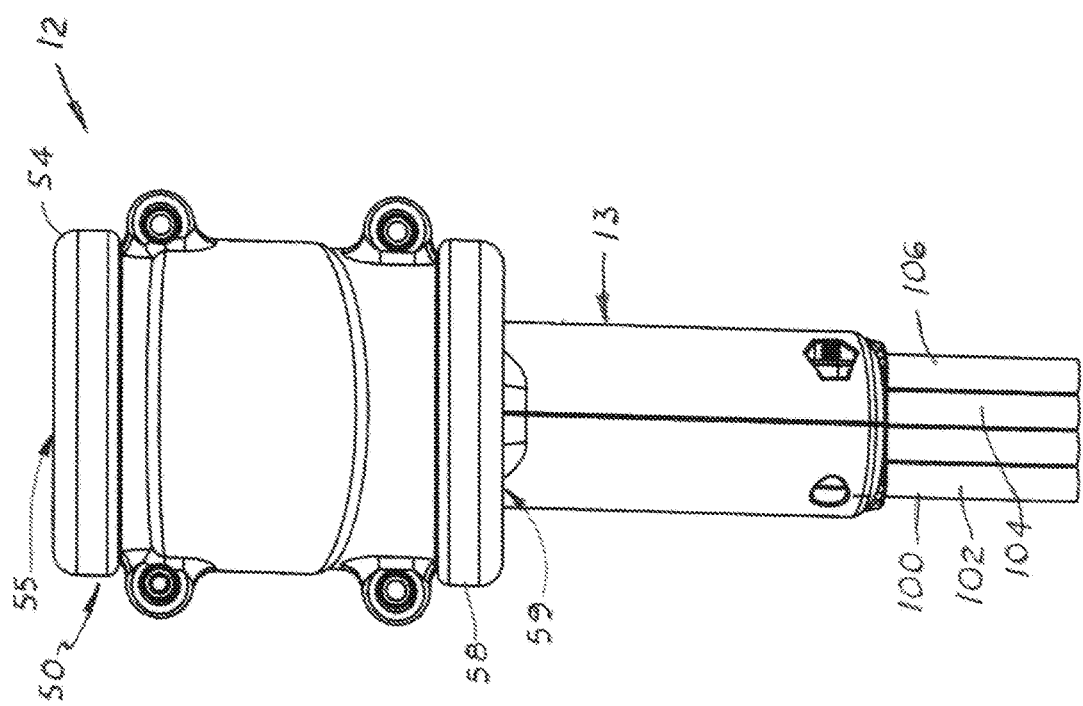
FIG. 5 is a front elevational view of the handpiece.

FIG. 1 shows a first embodiment of a teat preparation system 8 used to automatically and selectively clean teat 5 on a bovine with a pre-dip solution 121, then dry each teat 5 without using towels, and then apply a post-dip solution 127 to each teat 5 after milking System 8 includes a holder in the form of a handpiece 10 connected to a control unit 90 that controls the delivery of high-pressure air 115, a pre-dip solution 121, and a post-dip solution 127 to the handpiece 10.

As shown in FIGS. 1-5, the handpiece 10 is a two-part, clamshell structure that forms a hollow handgrip section 12, a hollow upper body 15, and a hollow teat receiving body 50. Mounted on the side of the upper body 15 is a mode switch 21. Mounted on the front surface of the handgrip section 12 is a trigger button 25. Mounted on the top surface of the upper body 15 is an optional light 28. The two half-sections 12A, 12B of the handgrip section 12, the upper body 15, and the teat receiving body 50 are integrally formed and connected via thread connectors 22.

Formed or attached to the handgrip section 12 is a trigger housing 23 containing a trigger switch 26. Mounted over the trigger switch 26 is a trigger button 25, hereinafter called a trigger. The upper body 15 includes a mode switch housing 18 and the mode switch 21. Inside the mode switch housing 18 is a sliding mode button 20 that moves the mode switch 21. Near the distal end of the proximal end 13 of the handpiece 12 is a conduit end support plate 19.

Attached or integrally formed on the upper body 15 is a cylindrical teat receiving body 50. In the embodiment shown, the teat receiving body 50 is made up of two half-shell structures joined with threaded connectors 22.

The teat receiving body includes an outer housing. Formed or attached around the upper end of the outer housing 52 is an upper cap 54. Formed or attached to the lower end of the outer housing 52 is a lower cap 58. Formed on the upper cap 54 is a top opening 55 and formed on the lower cap 58 is a lower opening 56. Located inside the outer housing 52 is an inner cavity 53.

Figure 10:
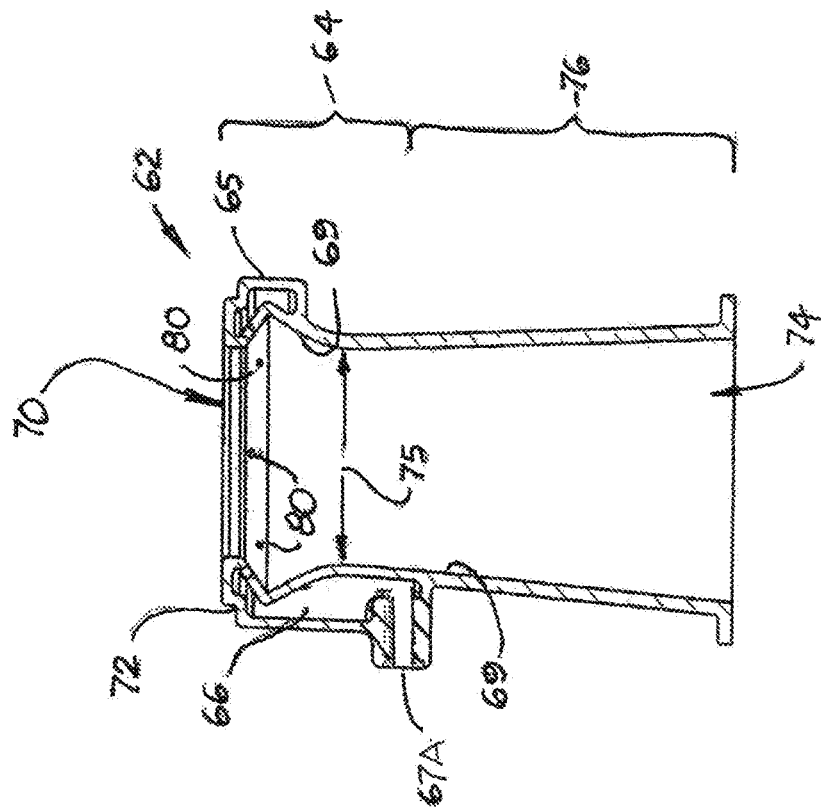
FIG. 10 is a sectional side elevational view of the spray cylinder shown in FIG. 9.
Figure 9:
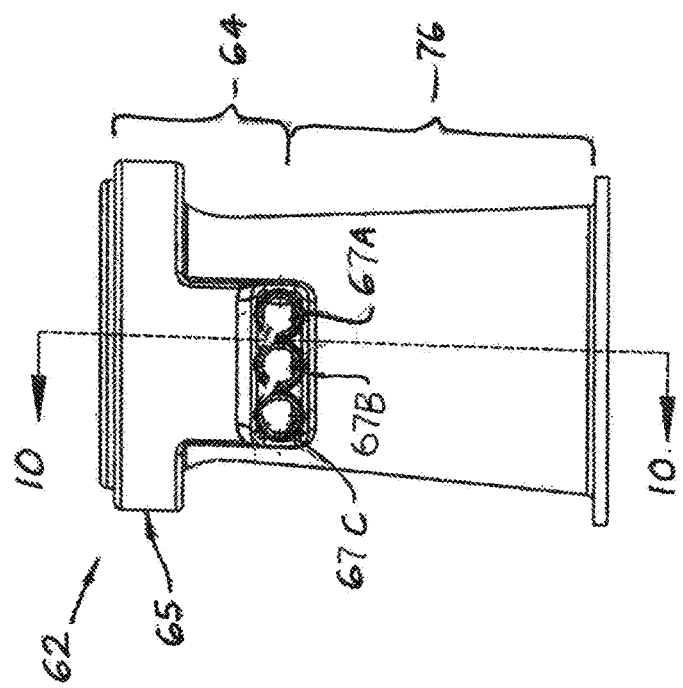
FIG. 9 is a rear elevational view of the spray cylinder.
Figure 11:
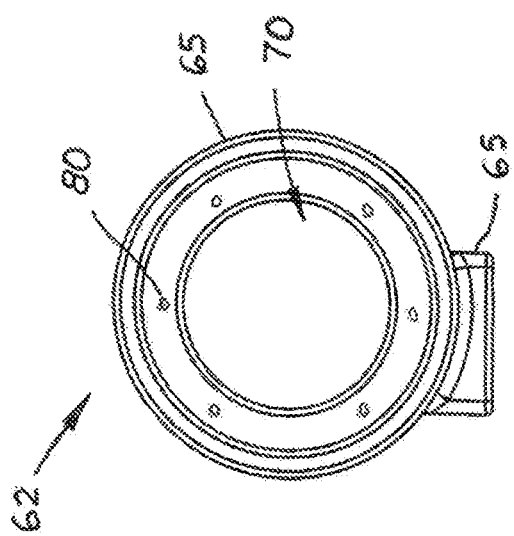
FIG. 11 is a top plan view of the spray cylinder.
Figure 12:
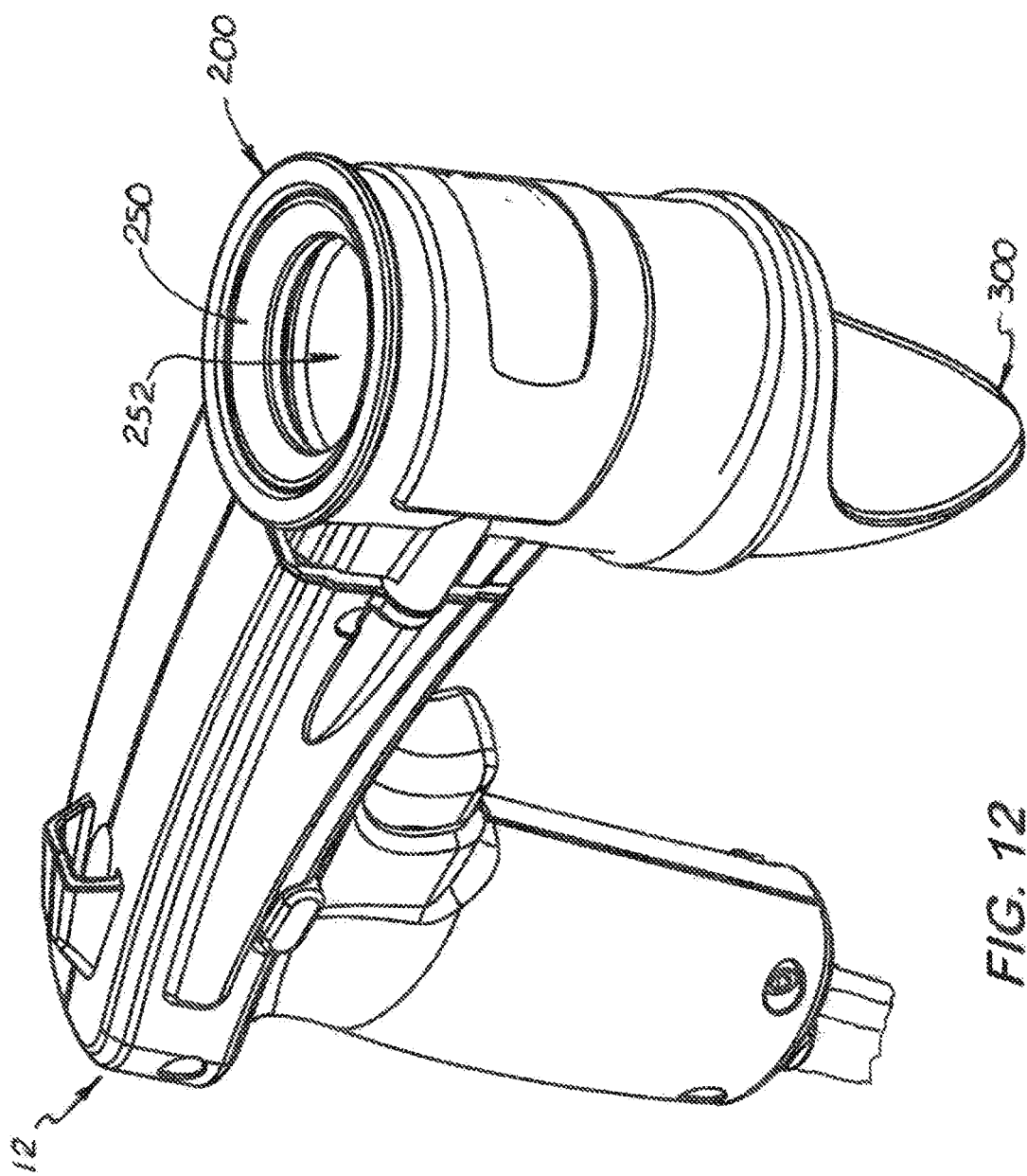
FIG. 12 is a perspective view of another embodiment of the handpiece.
Figure 13:
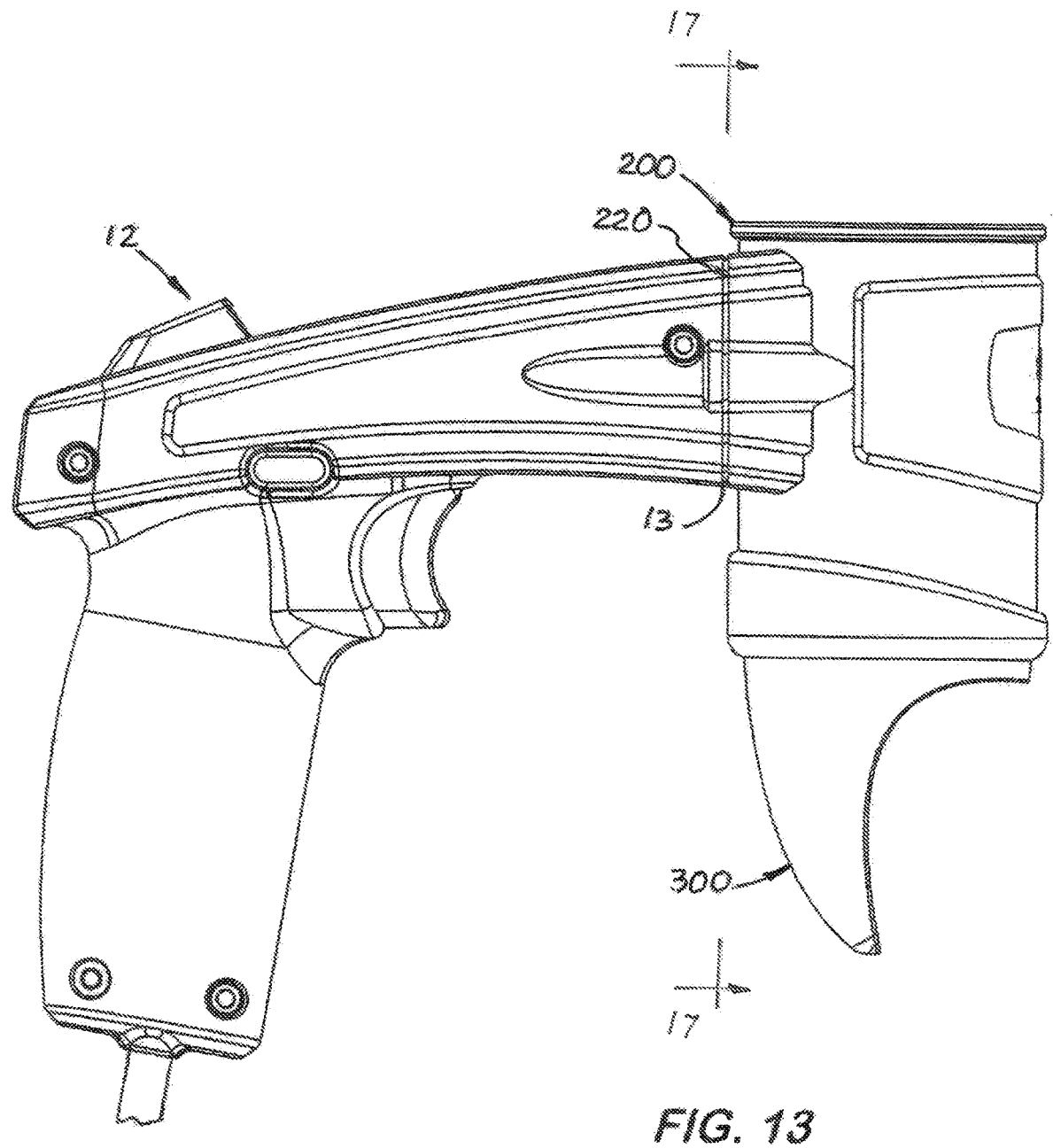
FIG. 13 is a left-side elevational view of the handpiece shown in FIG. 12.

Located inside the inner cavity 53 is a cylindrical spray cylinder 62. FIGS. 9, 10, and 11 show that the spray cylinder 62 includes an integrally formed upper section 64 and a lower cavity 76. Formed inside the spray cylinder 62 is a center bore 63. Integrally formed on the upper section 64 is a collar-shaped outer housing 65. Formed inside the outer housing 65 is a closed, circular mixing cavity 66. Formed on the lower inside surface of the outer housing 65 are air and fluid receiving ports 67A, 67B and 67C that communicate with the mixing cavity 66. The outer housing 65 and the mixing cavity 66 extend entirely around the spray cylinder 62.

The spray cylinder 62 includes a narrow top opening 70 configured to fit under the upper cap 54. The top opening 55 of the upper cap 54 and the top opening 70 are sufficiently wide to receive the upper portion of a teat 5. Formed on the lower end of the spray cylinder 62 is a wide bottom opening 74. During assembly, the wide bottom opening 74 is just inside the lower cap 58.

As shown in FIG. 10, the spray cylinder 62 includes a wide upper section 72 near the narrow top opening 70. Located below the top opening 70 is a plurality of downward aimed nozzles 80. The nozzles 80 are arranged in a circular pattern on the inside surface of the spray cylinder 62, so the entire surface of a teat 5 may be treated with high-pressure air 115, a pre-dip solution 121, and a post-dip solution 127. The sidewalls 69 of the spray cylinder 62 below the wide upper section 72 extend inward, forming a narrow neck opening 75 that partially restricts the downward flow of high-pressure air 115, the pre-dip solution 121, and the post-dip solution 127 through the spray cylinder 62.

The lower section 76 of the spray cylinder 62 below the narrow neck opening 75 is a conical shape, diverging and terminates at the spray cylinder's wide bottom opening 59. The combination of the wide upper section 72, the downward aimed nozzles 80, the narrow neck opening 75, and the diverging, conical-shape lower section 76 all act to create a suction that pulls a teat 5 into the spray cylinder 62 when the teat 5 is positioned ¼ to ⅓ inch above the top opening 70. Because a teat 5 after milking is flaccid, the suction is also used as a stretching force that causes the teat 5 to stretch longitudinally so that post-dip solution 127 may be applied to the creases and folds commonly found a flaccid teat 5.

Figure 6:
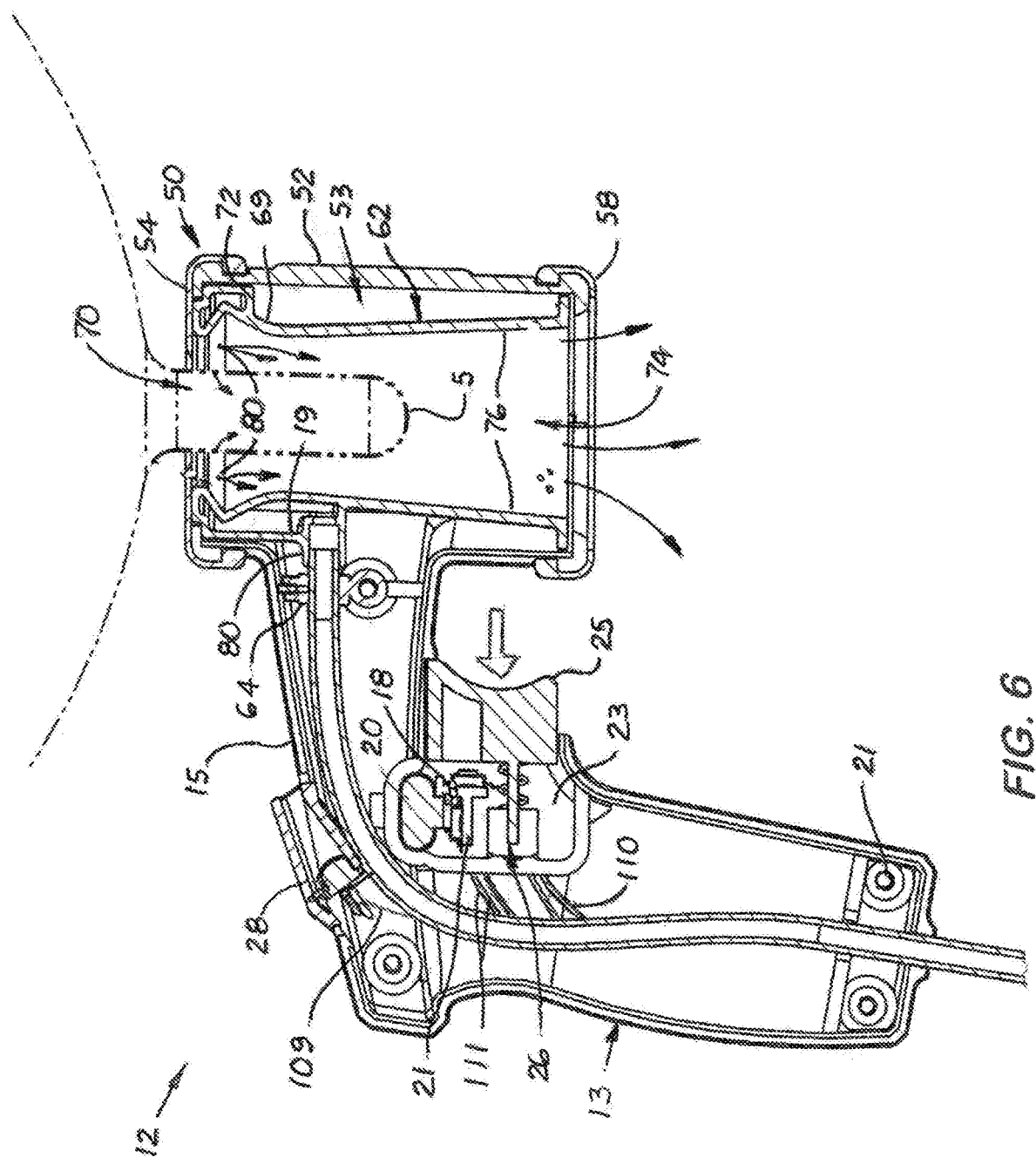
FIG. 6 is a sectional, side elevational view of the handpiece.
Figure 7:
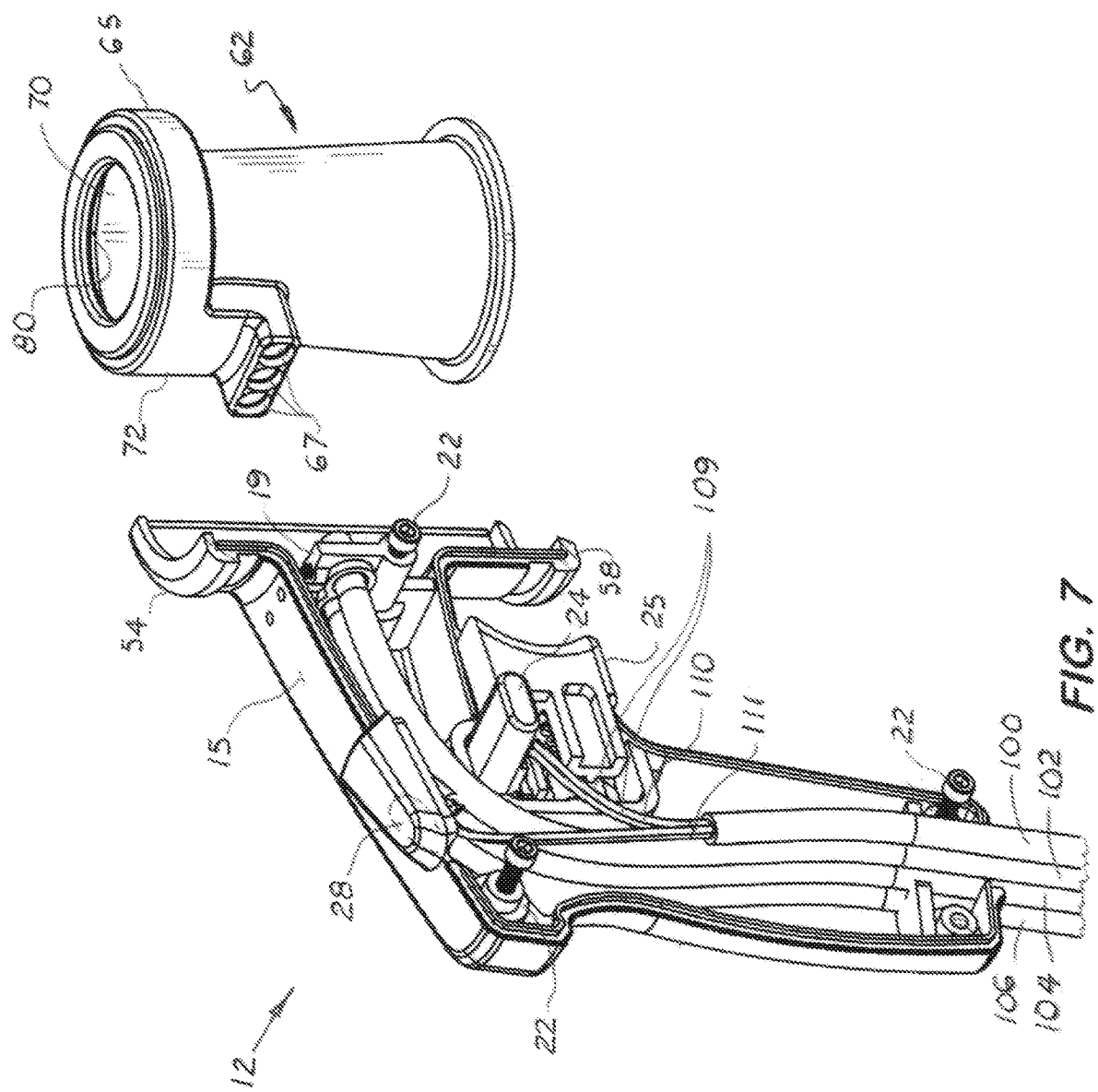
FIG. 7 is a sectional, partially exploded, rear perspective view of the handpiece.
Figure 8:
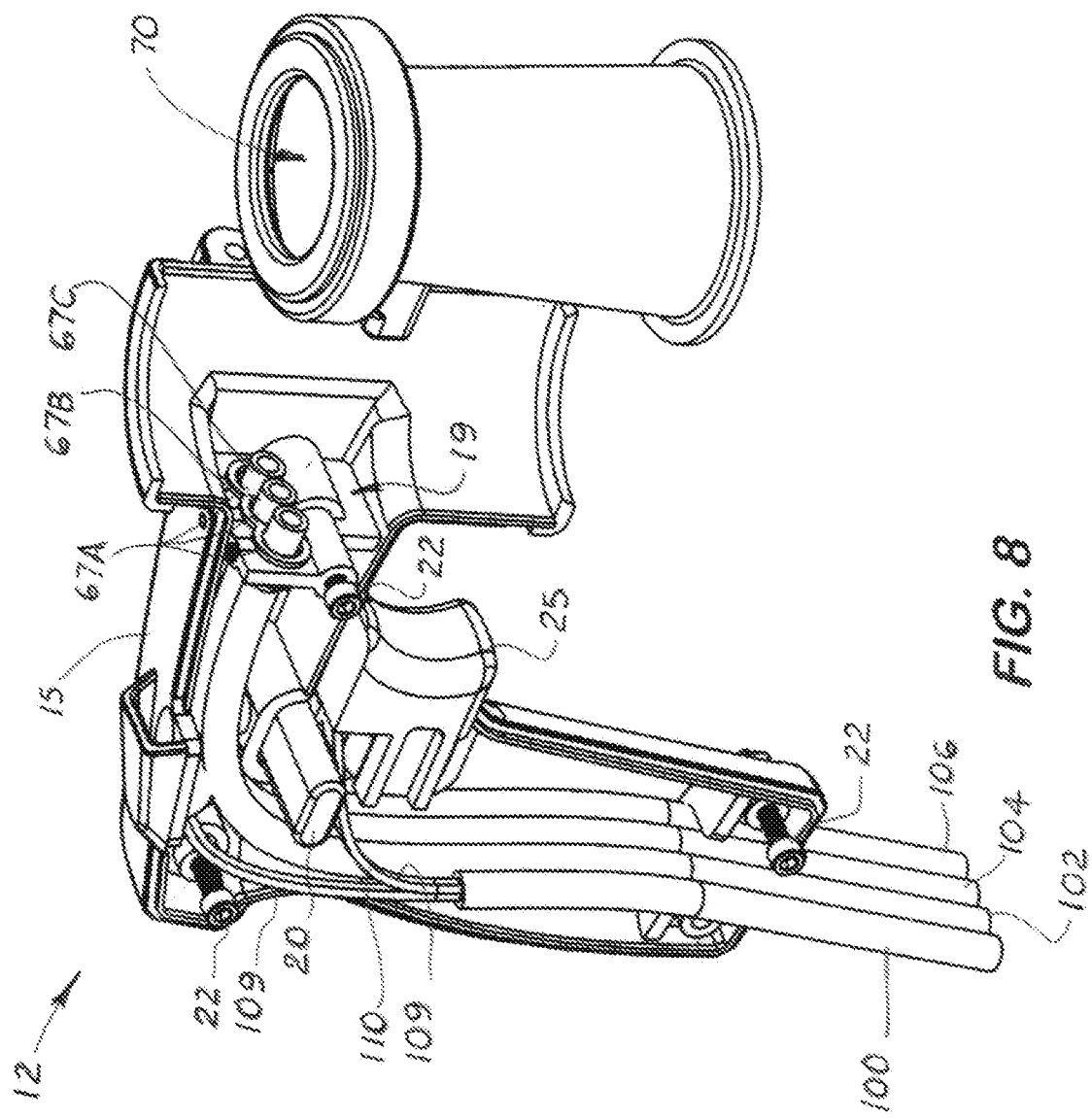
FIG. 8 is a sectional, partially exploded, front perspective view of the handpiece.

As shown in FIGS. 6-8, the handpiece 12 includes a set of internal conduits 102, 104, and 106 that extend from ports 67A, 67B, 67C formed on a transversely aligned conduit end support plate 19 located in the upper body 15. The internal conduits 102, 104, and 106 extend through the bottom end 16 of the handpiece 12 and connect to external conduits 114, 120, and 126, respectively. The external conduits 114, 120, and 126 carry high-pressure air 115, pre-dip solution 121, and post-dip solution 127 to the handpiece 12. During use, high-pressurized air 115, pre-dip solution 121, and post-dip solution 121 is delivered via the external conduits 114, 120, 126 to the internal conduits 102, 104, and 106, and then to the ports 67A, 67B, and 67C, respectively. The high-pressurized air 115, pre-dip solution 121, and post-dip solution 127 is then separately delivered to ports 67A, 67B, and 67C, respectively, formed on the outer housing 65 on the spray cylinder 62. The high-pressurized air 115, pre-dip solution 121, and post-dip solution 127 are then delivered to the circular large mixing cavity 66. The high-pressure air 115, pre-dip solution 121, and post-dip solution 127 then exit the mixing cavity 66 through the nozzles 80 and flow against the teat 5.

Extending into the handpiece 12 is an electrical cable 100 that contains wires 109, 110, and 111 that connect to the light 28, the mode switch 21, and the trigger switch 26, respectively. The end of electrical cable 100 connects to the control unit 90.

FIGS. 12-19 show another embodiment of the handpiece 12 with a second embodiment of the teat receiving body 200 that can be used with an exchangeable spray cylinder 250. The teat receiving body 200 is a cylindrical structure designed to be selectively attached to the proximal end 13 of the handpiece 12 with two threaded connectors 22. The handpiece 12 shown in FIGS. 12-19, is nearly identical to the embodiment of the handpiece 12 shown in FIGS. 1-6 except that the high-pressure port 67A, pre-dip solution port 67B, and post-dip solution port 67C are aligned vertically on the handpiece's proximal end 13.

The teat receiving body 200 includes a center bore 202 divided into an upper cylindrical space 262, and a lower cylindrical space 270. The air pressure port 222, the pre-dip port 224, and the pos-dip port 224 formed on the teat receiving body 200 extend inward and communicate with the center bore 202. The spray cylinder 250 fits and rests inside the center bore 202. The teat receiving body 200 has a bottom opening 208 and downward diverging sidewalls 216 which create a venturi and produce a suction force that draws the teat into the top opening 204.

The teat receiving body 200 includes a mounting surface 220 that presses against the proximal end 13 on the handpiece 12. Formed on the mounting surface 220 is a high-pressure air port 222, a pre-dip port 224, and a post-dip port 226. Ports 222, 224, and 226 are vertically aligned and spaced apart so they are aligned and registered with ports 67A, 67B ad 67C, respectively, formed on the handpiece 12. When the teat receiving body 50 is pressed against the proximal end 13 on the handpiece 12, the ports 222, 224, and 226 are configured to slide into ports 67A, 67B, and 67C, respectively. The connectors 22 force the teat receiving body 200 against the proximal end 13, so that adjacent ports are forced together to create airtight seals between them.

Figure 18:
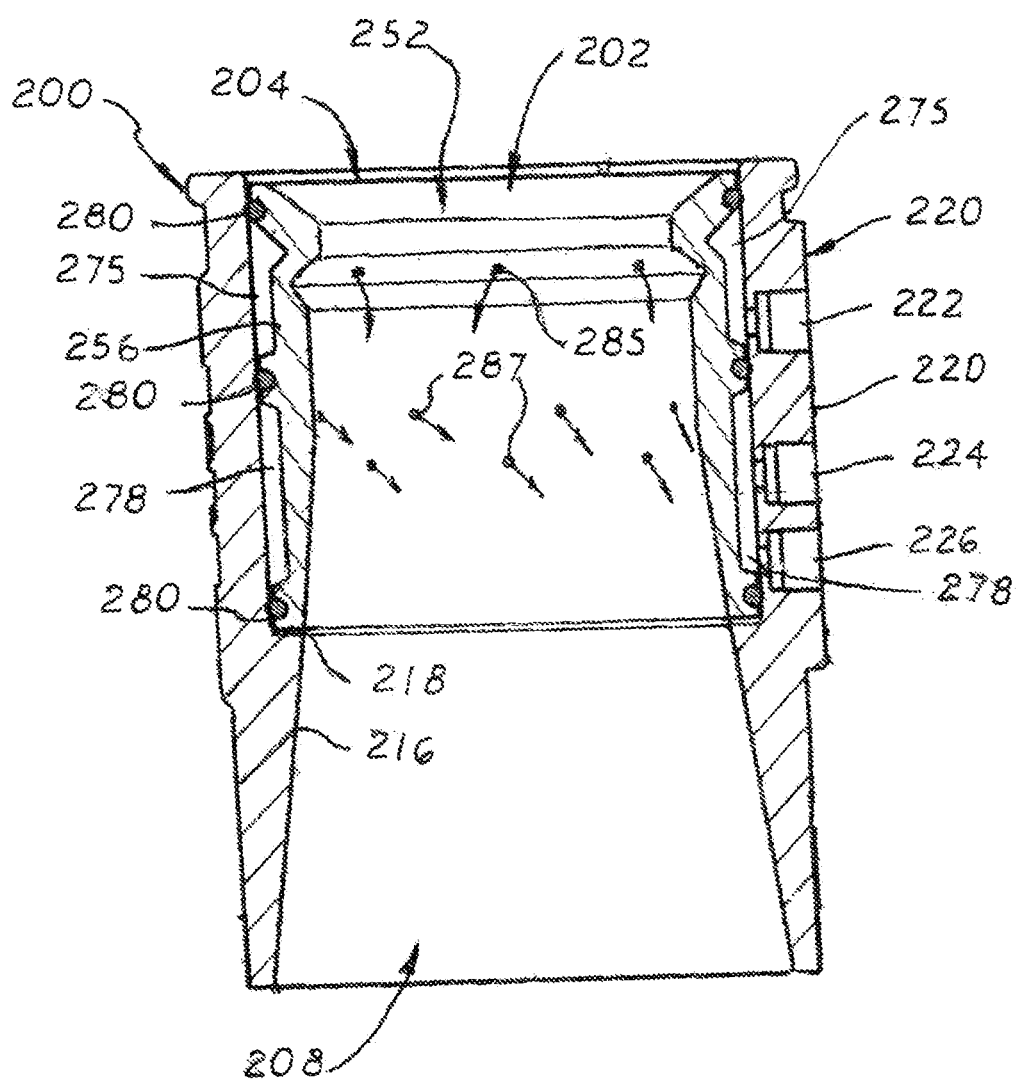
FIG. 18 is a sectional, side elevational view of the spray cylinder used in the handpiece shown in FIGS. 12-17 that has an upper raceway that communicates with the air port and a lower raceway that communicates with the lower raceway.

Spray cylinder 250, shown in FIG. 18, is a separate structure and is configured to slide into the center bore 202 formed in the teat receiving body 200. Spray cylinder 250 includes a central bore 252 with a narrow top opening 254 and a bottom opening 255. The diameter of the central bore 250 is between 20 to 40 mm. The sidewalls 25 of the spray cylinder 250 below the top opening 254 extend inward, forming a narrow neck opening 257 that partially restricts the downward flow of high-pressure air 115, the pre-dip solution 121, and the post-dip solution 127 through the spray cylinder 250.

Like spray cylinder 62, the lower space 270 on the spray cylinder 250 below the narrow neck opening 254 is a conical shape, diverging and terminates at the spray cylinder's bottom opening 255. The lower end surface 260 of the spray cylinder 250 rests on a stop edge 218 formed on the inside surface of the teat receiving body 200.

Figure 14:
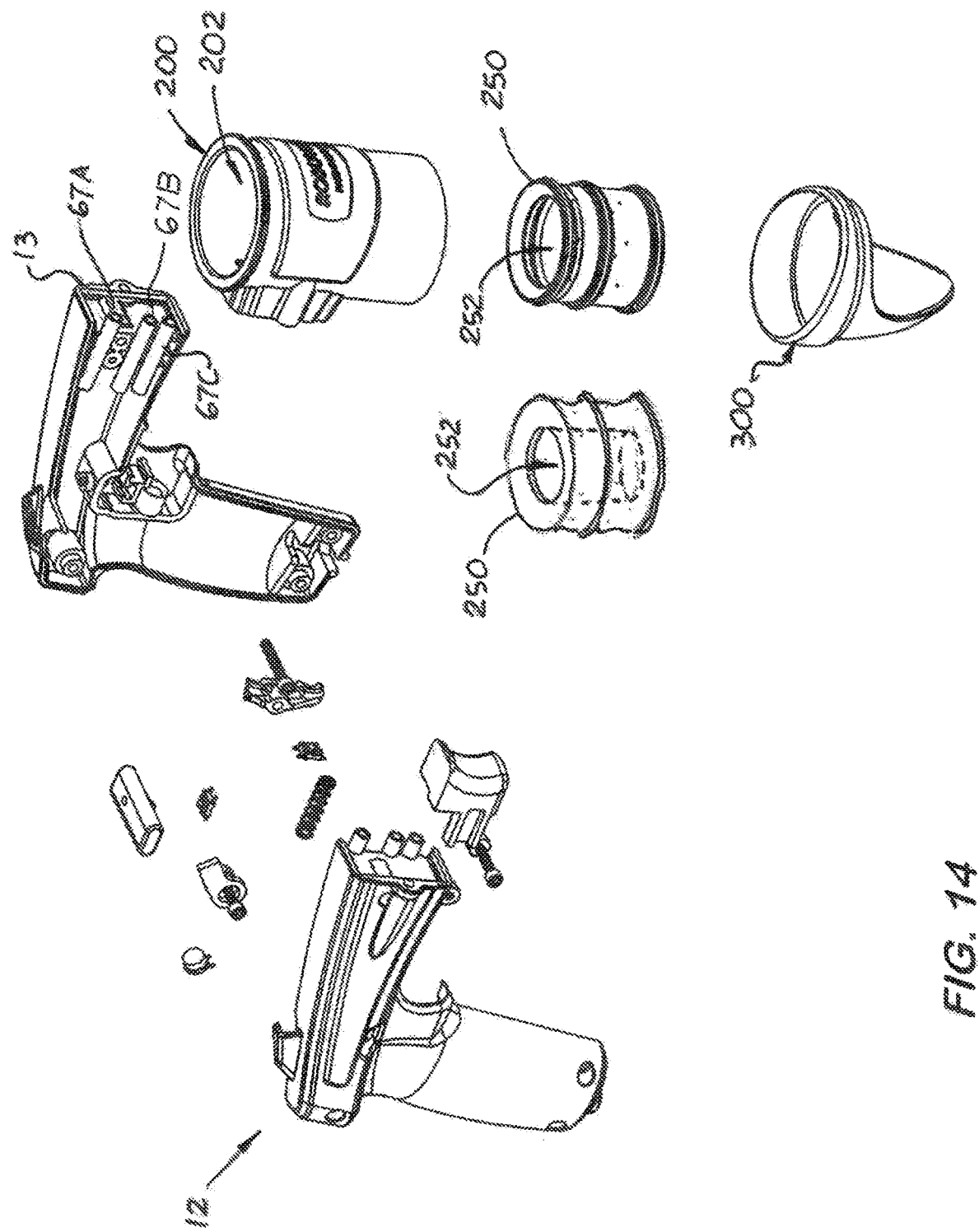
FIG. 14 is an exploded perspective view of the handpiece shown in FIG. 12.
Figure 15:
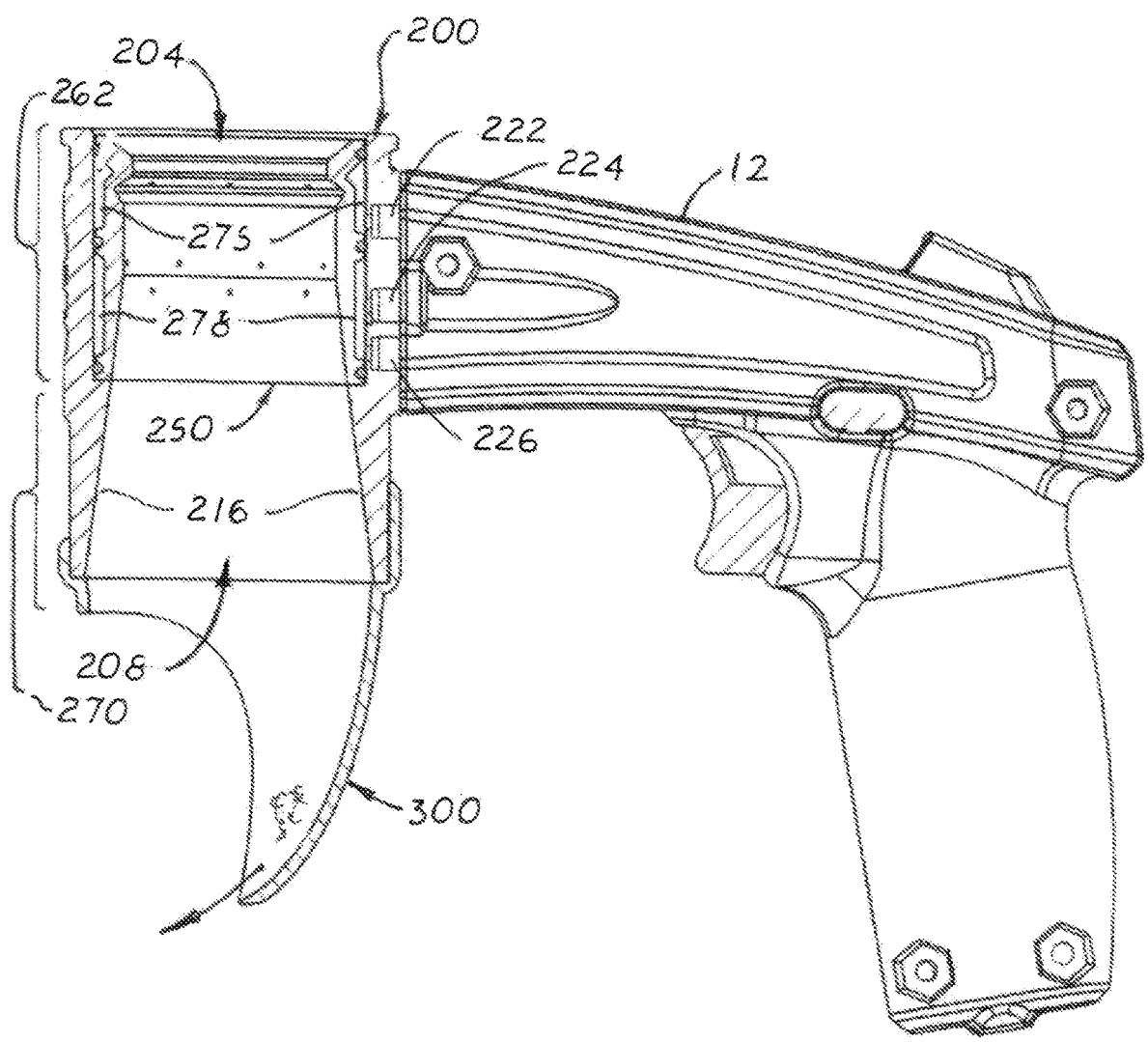
FIG. 15 is a side elevational view of one-half of the handpiece shown in FIG. 12.
Figure 16:
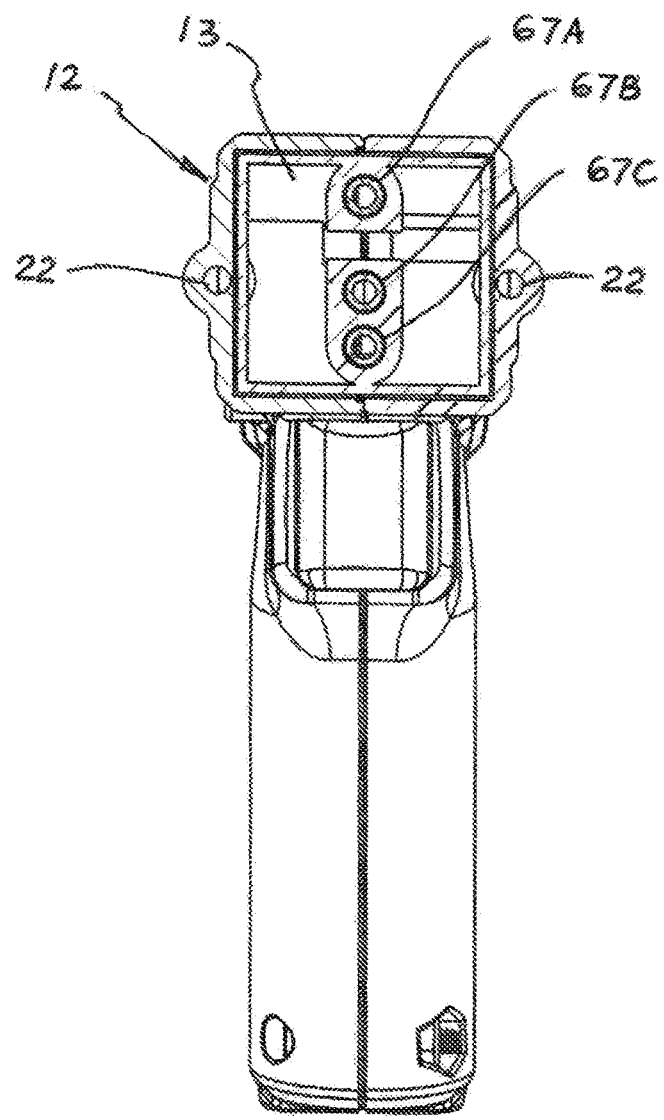
FIG. 16 is an end sectional view of the handpiece taken along line 16-16 in FIG. 13.
Figure 17:
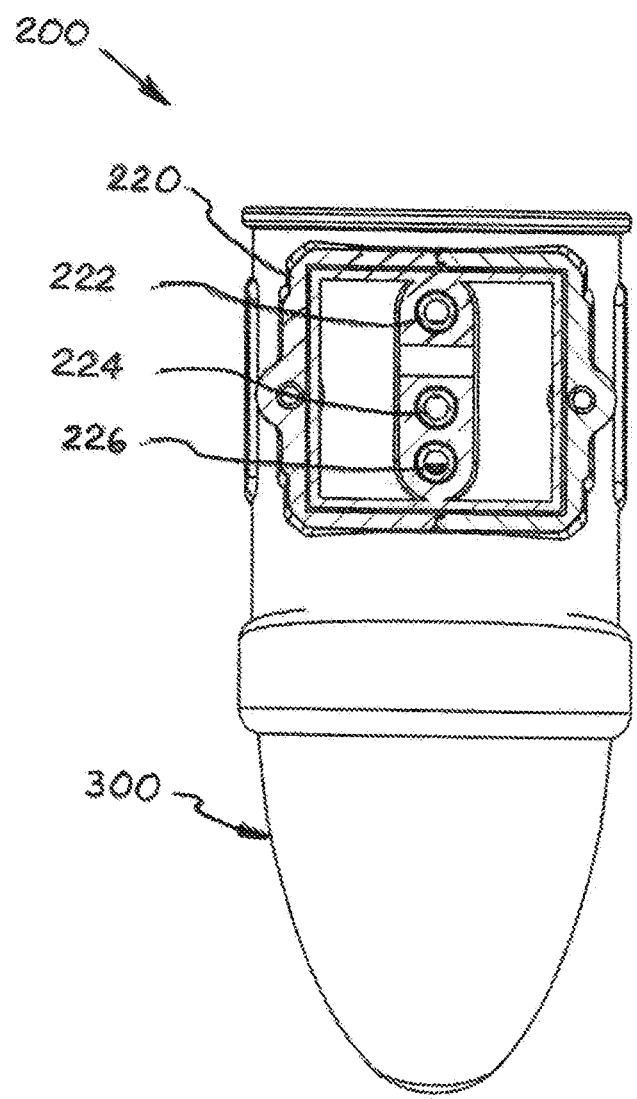

The spray cylinder 250 is configured to be selectively inserted and removed from the teat receiving body's center bore 202 (shown more clearly in FIG. 14). The outer surface of the sidewall 256 bends inward and forms at least two circular raceways—an upper raceway 275, and a lower raceway 278 when the spray cylinder 250 is inserted into the teat receiving body 200. Three O-rings 280 are attached to the spray cylinder's outer surface above and below the raceways 275, 278 to isolate the two raceways 275, 278 from each other and to prevent air and solution leakage.

When inserted into the teat receiving body 200, the upper raceway 275 is aligned with the high-pressure air port 222 extending into the center bore 202. The lower raceway 278 is larger than the upper raceway 275 and is aligned both with the pre-dip port 224 and the post-dip port 226.

Formed on the inside surface of the spray body 250 adjacent to the upper raceway 275 is a first set of high-pressure air nozzles 285. During use, high-pressure air 115 is delivered via the high-pressure air port 222 on the teat receiving body 200 flows into upper raceway 275 and exits from the first set of high-pressure air nozzles 285. Pre-dip solution 121 and post-dip solution 127 are delivered to the lower raceway 278 and exit through a second set of nozzles 287 that communicate with the lower cavity 278.

Figure 19:
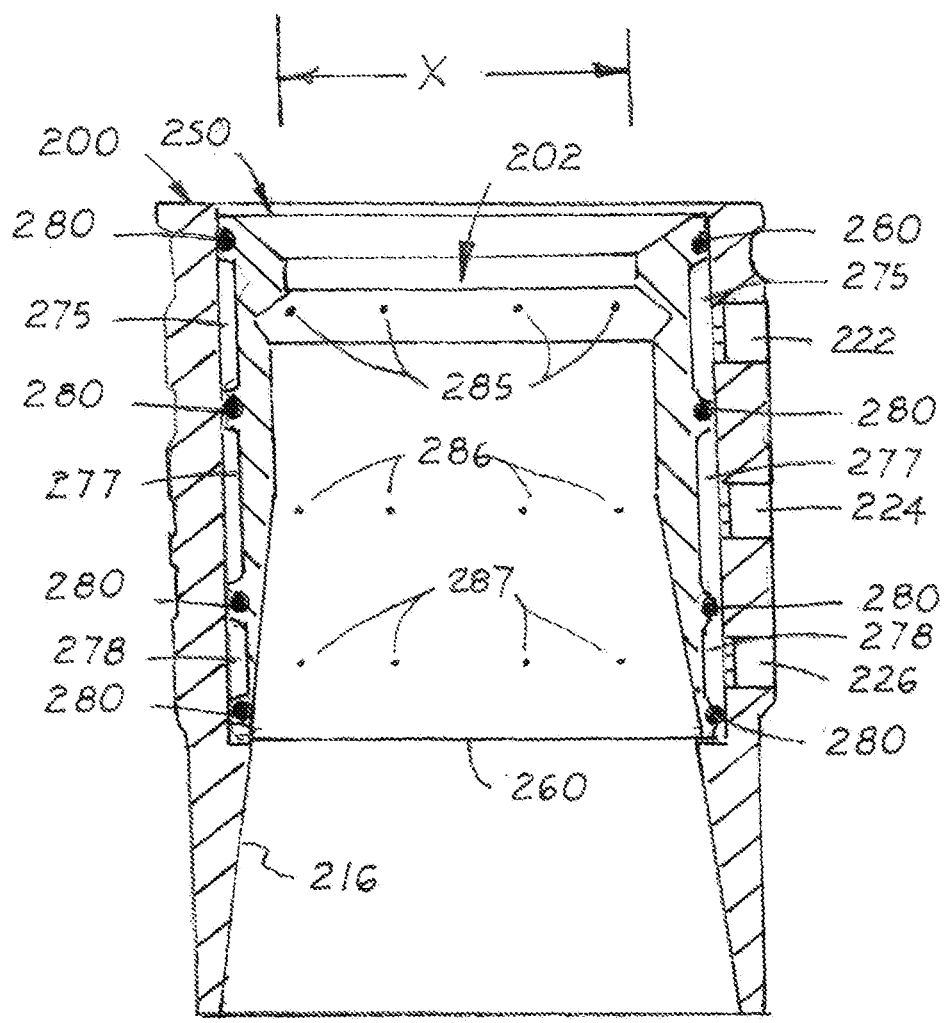
FIG. 19 is a sectional, side elevational view of another embodiment of the spray cylinder that has an upper raceway, an intermediate raceway and a lower raceway that communicate with the air port, the pre-dip solution port, and the post-dip solution port, respectively.

FIG. 19 is a sectional, side elevational view of another embodiment of the spray cylinder that has an upper raceway 275, an intermediate raceway 277 and a lower raceway 278 that communicate with the air port 222, the pre-dip solution port 224, and the post-dip solution port 226, respectively. Each raceway 275, 277 and 278 is separated from an adjacent raceway by o-rings 280 (four total) that prevent the air and solutions delivered to raceways from mixing.

Like the embodiment of the spry cylinder 200 shown in FIG. 19, the spray cylinder 200 has also has a first set of high-pressure air nozzles 285 adjacent to the upper raceway 222, a second set of nozzles 286 that communicate with the intermediate raceway 224, and a third set of nozzles 287 that communicate with the lower raceay 226. During use, high-pressure air 115 is delivered via the high-pressure air port 222 on the teat receiving body 200 flows into upper raceway 275 and exits the high-pressure air nozzles 285. Pre-dip solution 121 and post-dip solution 127 are separately delivered to the intermediate and lower raceways 277 and 278 and exit through the second and third set of nozzles 286 and 287.

Figure 20:
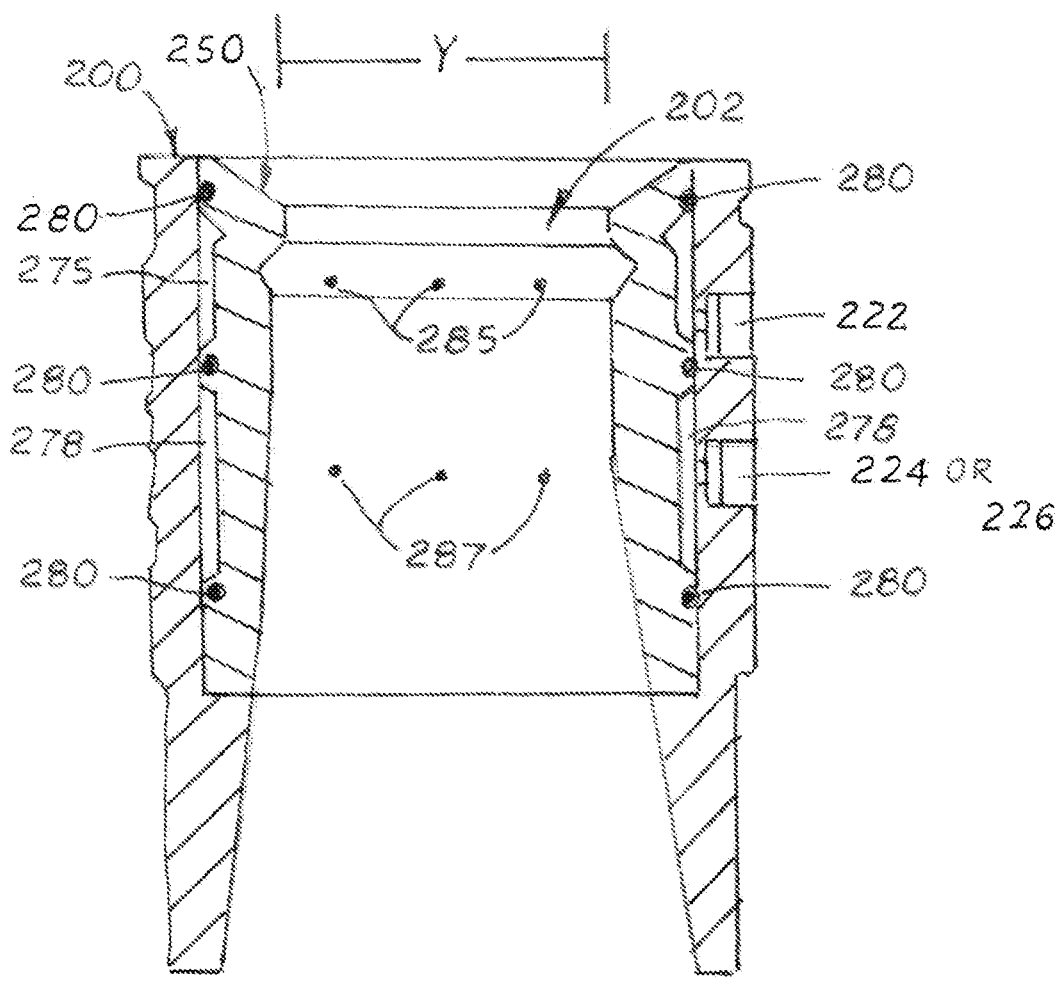
FIG. 20 is a sectional, side elevational view of another embodiment of the spray cylinder with smaller diameter central port than the spray cylinder shown in FIG. 19 and has an upper raceway that communicates with an air port and a lower raceway that communicates with a pre-dip solution port or a post-dip solution port.

FIG. 20 is a sectional, side elevational view of another embodiment of the spray cylinder 200 with smaller diameter central port 202 than the spray cylinder shown in FIG. 19. The spray cylinder shown in FIG. 20 has two raceways—upper raceway 275 that communicates with an air port 222 and a lower raceway 278 that communicates with a port designated as a pre-dip solution port 224 or a post-dip solution port 226. O-rings 280 are placed around the spray cylinder 200 to prevent leakage and prevent mixing of air and solutions in the raceways 275 278.

In all of the embodiments of the spray cylinders 200, there are six to eight air nozzles 285 and eight to sixteen liquid nozzles 286, 287. Some or all of the nozzles 285, 286, and 287 may be aimed downward at 30 to 45 degrees. Some nozzles 285. 286, 287 aimed radially thereby forcing the air and solutions to travel in a circular path along the inside surface of the spray cylinder 230. It should also be noted that the type and number of nozzles 285, 286, 287 formed on the spray cylinders 250 may also vary. Because the control unit 90 is programmable by the manufacturer, the control unit 90 may include optional mode settings that allow a user to use different spray cylinders (not shown) with a different arrangement of nozzles for different operational modes.

Also, as shown in FIGS. 12-15, and 17, a deflection cap 300 may be integrally formed or attached to the modified spray cylinder 250 lower edge. The deflection cap 300 is configured to re-focus and concentrate the high-pressure air, pre-dip solution and post-dip solutions exiting the lower section of the teat receiving body into a narrow stream. The deflection cap 330 has a complex curved outer body that curves inward and forms a point. The air, pre-dip, and post-dip solutions stream is narrow and redirected approximately 20 to 45 degrees from the horizontal axis. By narrowing and re-focusing the stream inward, overspray is prevented. While holding the handpiece, the user may aim the high-pressure air 115, pre-dip solution 121, and/or post-dip solution 127 at excessively dirty or hard-to-reach areas on the teat or udder. It should be understood that the deflection cap 112 may also be integrally formed or attached to the handpiece shown in FIGS. 1-8.

Figure 22:
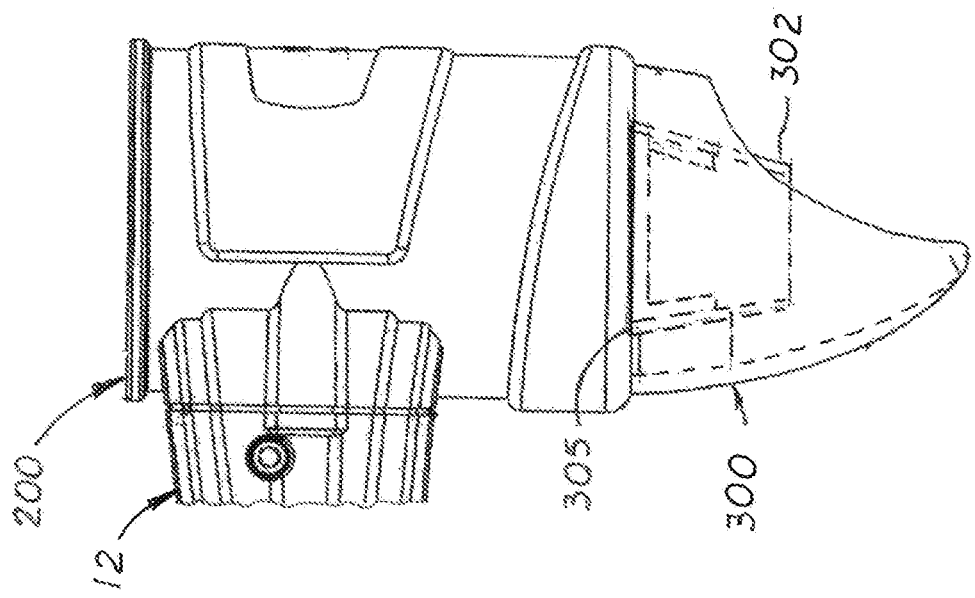
FIG. 22 is a side elevational view of the teat receiving body with the deflection cap, diffuser, and agitator.
Figure 21:
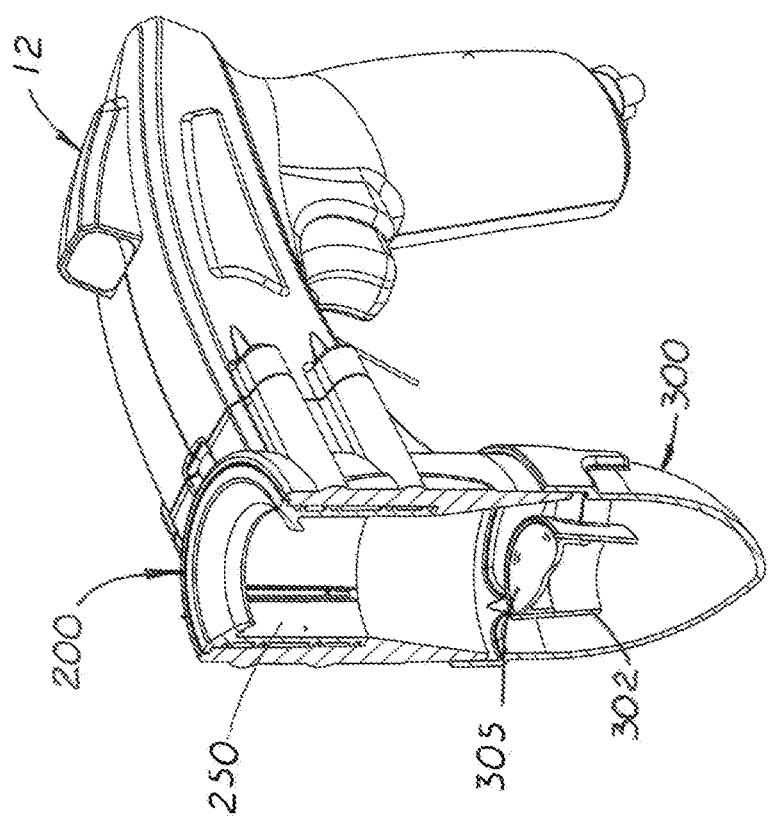
FIG. 21 is a perspective view of the handpiece with a spray cylinder with the deflection cap attached to the end of the teat receiving body, located inside the deflection cap is a diffuser with an agitator.
Figure 24:
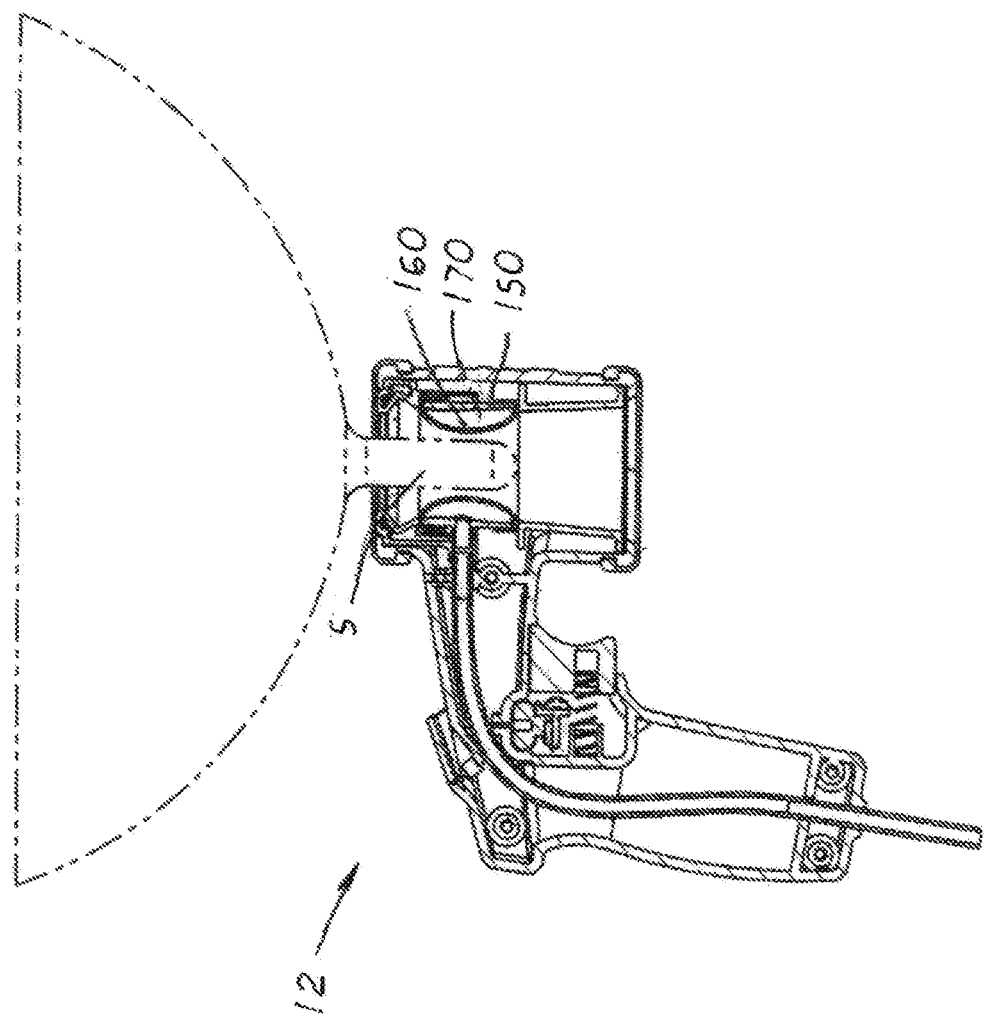
Figure 25:
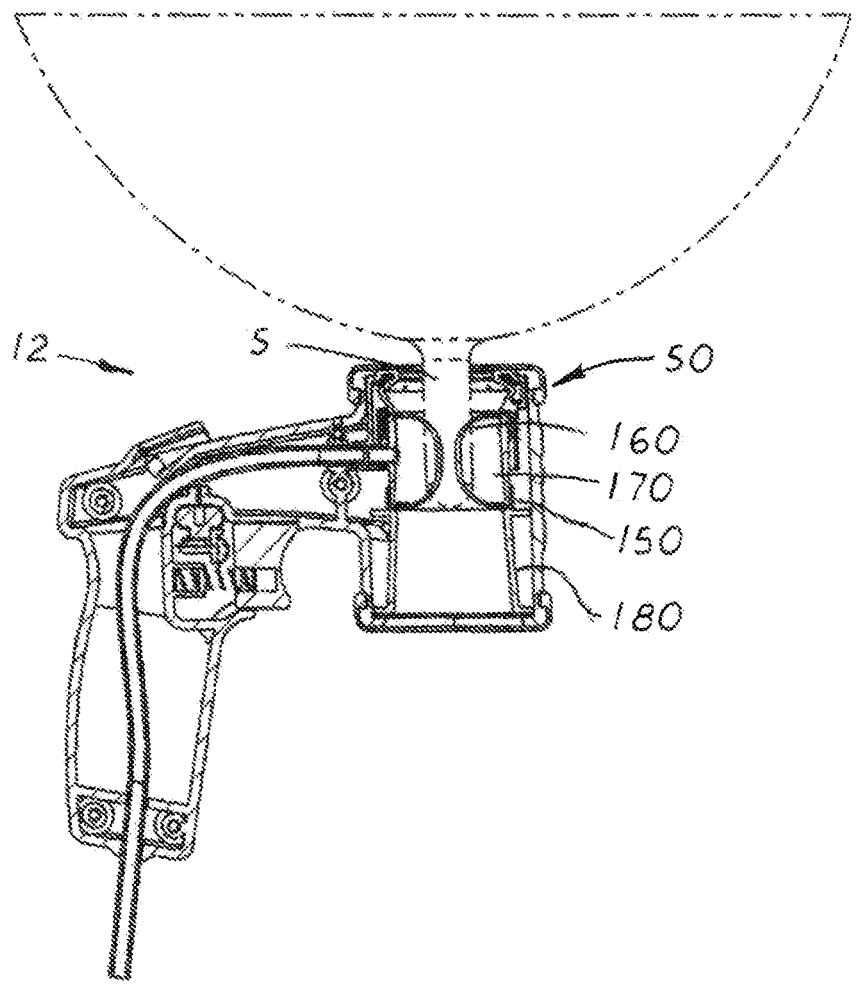
Figure 26:
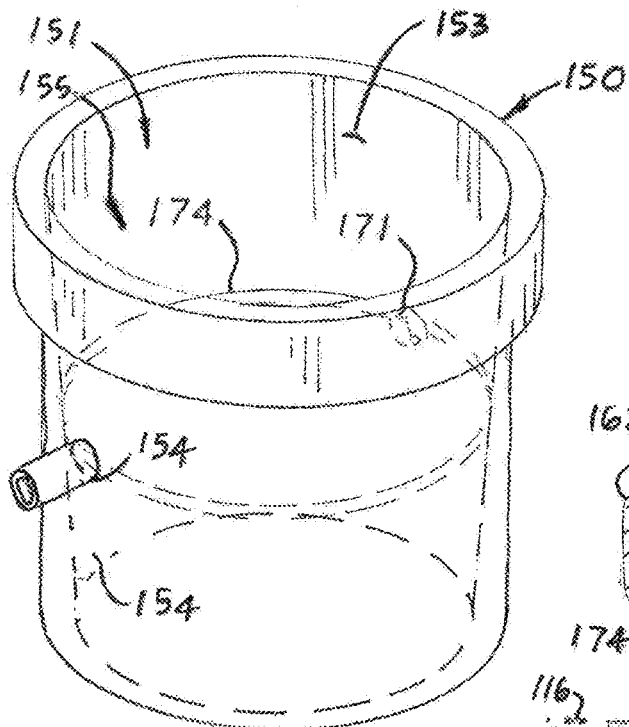
FIG. 26 is a front perspective view of the bladder frame used in the embodiment shown in FIGS. 23-25.
Figure 27:
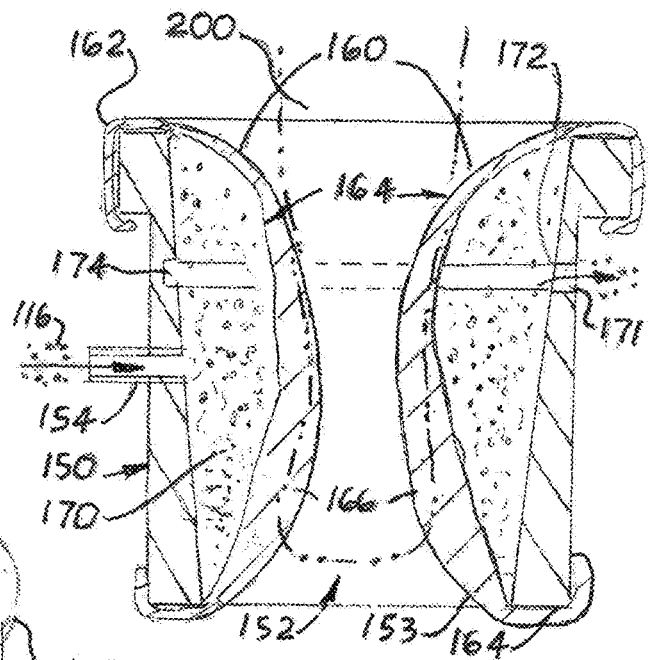
FIG. 27 shows a sectional side elevational view of the bladder frame and an elastic sleeve placed therein.
Figure 28:
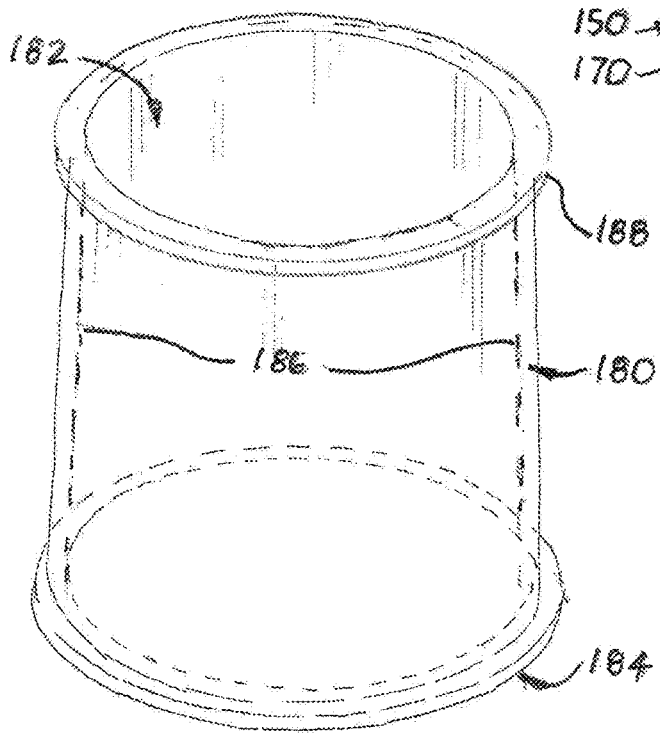
FIG. 28 is a perspective view of the lower support frame.
Figure 29:
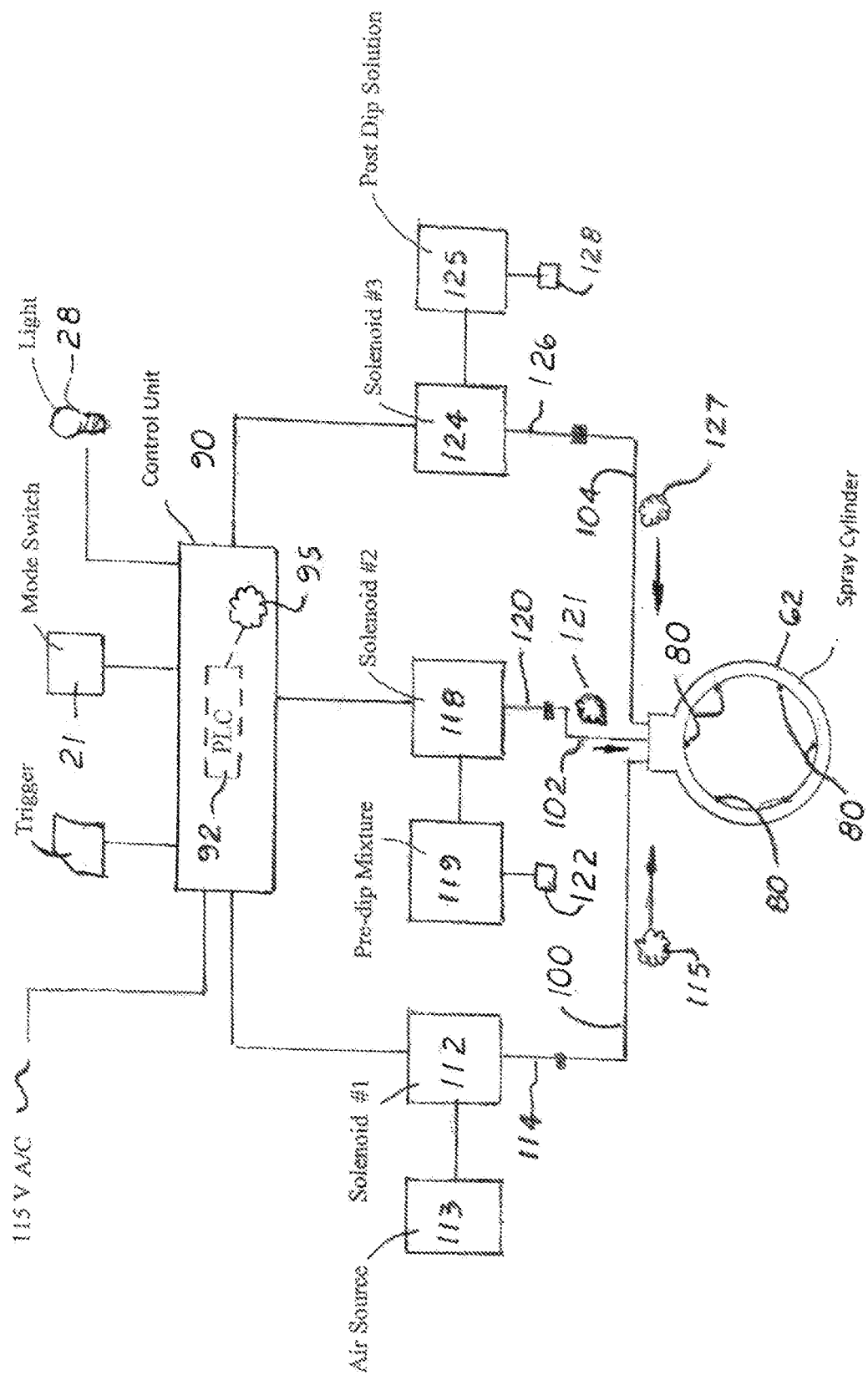
FIG. 29 shows the interconnections of the components used in the non-stripping embodiment shown in FIGS. 1-22.
Figure 30:
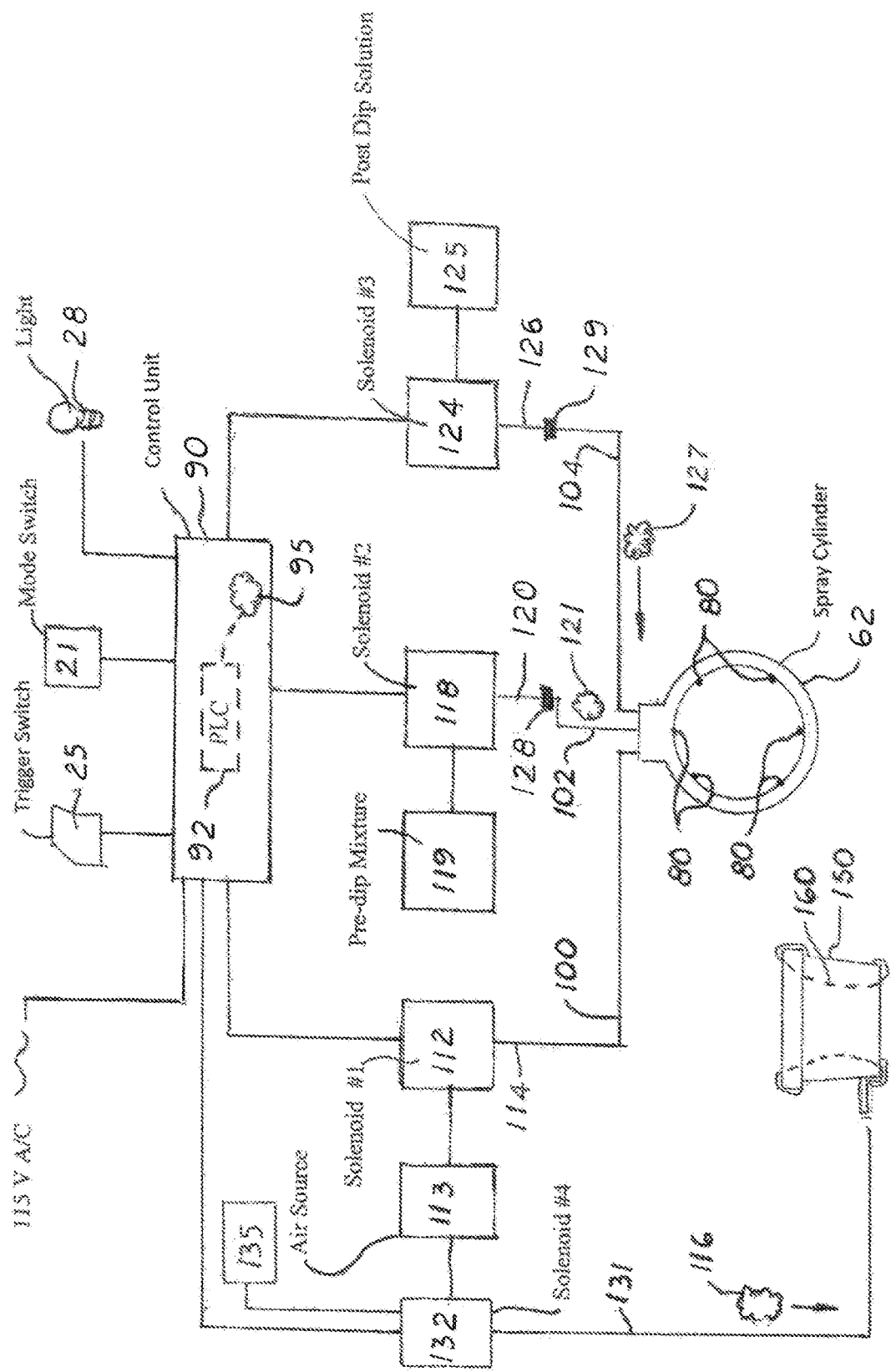
FIG. 30 is a diagram showing the interconnections of the components used in the system that uses the stripping embodiment shown in FIGS. 23-28.
Figure 31:
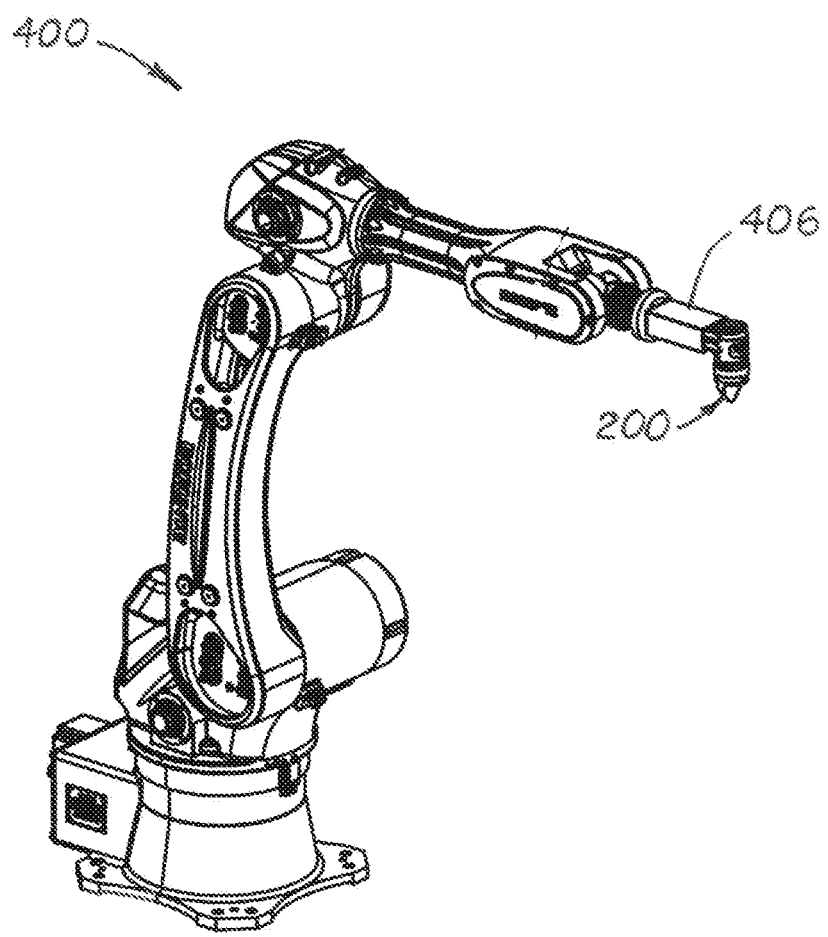
FIG. 31 is a perspective view of a robotic head assembly with one teat receiving body attached to a single rotating support arm.

FIGS. 21 and 22 are views of the teat receiving body 200 containing a spray cylinder 250 and the deflection cap 300 with a diffuser 302 and agitator 305 positioned transversely inside the deflection cap 300. During operation when with high pressure air and pre-dip and post dip solutions flow through the deflector cap 300, the diffuser 302 and agitator 303 disturb the linear flow of the downward flow of air, and the solutions, which creates turbulence and increase their distribution inside the deflection and through the deflection cap's end opening.

In all of the above embodiments described above, the handpiece 12 is a part of a system 8 that includes a control unit 90. The control unit 90 includes programmable logic control, called a PLC indicated by reference number 92, with a software program 95 loaded into its working memory. The PLC 92 and the software program 95 are configured to control the delivery of high-pressure air precisely 115, pre-dip solution 121, and post-dip solution 127 to the handpiece 12. As shown in FIG. 18, the control unit 90 is connected to a first solenoid 112, a second solenoid 118, and a third solenoid 124. The first solenoid 112 is connected to a pressurized air source 113 and to an external conduit 114 that connects to the internal conduit 102 inside the handpiece 12. The second solenoid 118 is connected to a pre-dip solution source 119, and the external conduit 120 connects to an internal conduit 102 inside the handpiece 12. The pre-dip solution 121 may be delivered to an optional heater 128 connected to the conduit 120 that pre-heats the pre-dip solution 121 to approximately 90 to 120 degrees F. before delivery to the internal conduit 102.

Third solenoid 124 is connected to a post-dip solution source 125 and an external conduit 126 that connects to internal conduit 106 inside the handpiece 10. The third solenoid 124 may also be connected to an optional heater 129 connected to the conduit 126 that pre-heats the post-dip solution 127 to approximately 90 to 120 degrees F. before delivery to the nozzles 80.

As discussed further below, the software program 95 is configured to control when and how long each solenoid 112, 118, and 124 opens and closes. During use, the operator manipulates the mode switch 21 to select one of two operating modes—a pre-dip solution application mode: and a post-dip solution application mode. The two modes determine which solenoid opens and closes and how long. The operator then manipulates trigger 25 to initiate the operating mode selected by the mode switch 21.

Operation of the Cleaning, Pre-Dip Application, and Post-Dip Solution Embodiment When the mode switch 21 is moved to the first mode position, and the operator presses the trigger 25, the PCL 92 is activated, which runs the first stage mode routine. During the first mode routine, the software program 95 and the PLC 92 open the first solenoid 112 connected to the pressure air source 113 containing high-pressure air 115 (approximately 150 PSI). During the first mode routine, the second solenoid 118 is opened simultaneously with the first solenoid 112. When the second solenoid 118 is opened, pre-dip solution 121 is delivered to the handpiece 10. When the second solenoid 118 is activated, the optional heater 129 may also be activated to heat the pre-dip solution 121.

The software program 95 is configured to open both the first and second solenoids 112, 118, respectively, when trigger 25 is continuously pressed. Both high-pressure air 115 and the pre-dip mixture 121 are delivered to handpiece 12 and discharged from the nozzles 80. The first and second solenoids 112, 118 remain open as long as trigger 25 is pressed.

When trigger 25 is released, the software program 95 is configured to close the second solenoid 118 immediately, thereby discontinuing the pre-dip solution 121 to nozzles 80. In addition, the software program 95 controls the PLC 92 so that the first solenoid 112 remains open for approximately 2 seconds after the second solenoid 118 closes, allowing only high-pressure air 115 to flow from the nozzles 80 and remove excessive pre-dip solution 121 from the surface of the teat 5. If the operator presses the trigger 25 again while the first solenoid 112 is opened and the second solenoid 118 is closed, the first stage mode routine automatically re-runs.

When the mode switch 21 is moved to the post-dip application mode position and the trigger 25 is pressed, the PCL 92 runs the second stage mode routine. In the second stage mode routine, the first solenoid 112 opens to deliver high-pressure air 115 to the nozzles 80. The first solenoid 112 is open as long as the trigger 25 is pressed. When trigger 25 is released, the third solenoid 124 opens to deliver post-dip solution 127. If the third solenoid 124 is connected to an optional heater 129, the post-dip solution 127 is heated before delivery to the handpiece 12.

When trigger 25 is released, the first solenoid 112 remains open for 0.25 to 0.5 seconds, allowing high-pressure air 115 to be released from the nozzles 80 and mixed with the post-dip solution 127. The mixture of high-pressure air 115 and post-dip solution 127 causes the post-dip solution 127 to atomize and spread across the entire surface of the teat 5. The software program 95 is also configured to keep the third solenoid 124 open 0.25 to 0.5 seconds after the first solenoid 112 closes so that the entire teat 5 is wetted with post-dip solution 127.

Stripping Embodiment

FIGS. 19-21 show another embodiment of system 8 that includes the handpiece 12 and control unit 90 used in the first embodiment discussed above. In this embodiment, the software program is re-programmed or replaced by a modified software program 96, and the spray cylinder 62 is replaced by a stripping spray cylinder 130. The stripping spray cylinder 130 includes the same upper section 64 with an outer housing 65, a mixing cavity 66, and nozzles 80. During use, a teat 5 is placed over the top opening of the upper section 64 and drawn into the center bore. High-pressure air 115, pre-dip solution 121, and post-dip solution 127 are then delivered to and dispensed from the nozzles 80 described above in the spray cylinder 62, 250.

The stripping spray cylinder 130 is configured to rest over a cylindrical, inflating member 140 placed inside the teat receiving body 50. The inflating member 140 is stacked above a short conical support structure 180.

The inflating member 140 includes a cylindrical bladder frame 150 that fits into the teat receiving body 50. As shown in FIG. 23, the bladder frame 150 includes a top opening 151, a bottom opening 152, and sidewalls 153 that converge in a downward direction forming a conical-shaped center passageway 155. Extending through a sidewall 153 is a laterally extending air inlet 154 that communicates with a center passageway 155 formed in the bladder frame 150. The air inlet 154 is located near the middle section of the bladder frame 150. Also formed on the bladder frame 150 is a small exhaust port 171 located on the opposite side of the bladder frame 105 that also communicates with the inner air cavity 170. Extending along the inside surface of the sidewall 152 and aligned with the exhaust port 171 formed on the bladder frame 150 is a circular channel 174.

As shown in FIG. 23, the bladder frame 150 rests on top of a short conical support structure 180 that fits inside the teat receiving body 50. The conical support structure 180 includes a top opening 182, and a bottom opening 184. Formed around the top opening 182 is a wide-diameter upper lip 188. Formed around the inside diameter of the short conical support 180 are diverging sidewalls 186.

Located inside the bladder frame 150 is an elastic bladder sleeve 160 is configured to sequentially expand and relax repeatedly against the sides of a teat 5. The bladder sleeve 160 is a ballooning, cylindrical-shaped structure with thin upper sidewalls 164 (approx. 1 ml thick) relatively thick lower sidewalls 166 (approximately 3 to 4 mils thick). The bladder sleeve 160 includes a circular upper edge 162 configured to stretch over the upper edge of the bladder frame 150 and a lower edge 164 configured to stretch over the lower edge of the bladder frame 150. The upper and lower edges 162, 164 affix the bladder sleeve 160 to the bladder frame 150. The inside surface of the sidewalls of the bladder sleeve 160 extends inward and narrows from top to bottom and then extends outward to form an adjustable, hourglass-shaped center passageway 166 in which the teat 5 is placed.

When the bladder sleeve 160 is assembled on the bladder frame 150, the center, outside sidewalls of the bladder sleeve 160 are detached from the bladder frame 150. An inner air space 170 is formed between the inside surface of the bladder frame 150 and the outside surface of the bladder sleeve 160. The air space 170 is partially closed so that air trapped inside the inner air space 170 escapes only through the exhaust port 171. Because the center passageway 166 has an hour-glass configuration and the thickness of the sidewall 164 of the bladder sleeve 160 is thinner in the upper portion and therefore more flexible than the lower portion of the bladder sleeve 160, the upper portion of the bladder sleeve 160 expands inward before the lower portion to gradually squeeze the teat 5 in a downward, wave-like manner Because the upper portion of the bladder sleeve 160 is relatively thin (1 to 2 mls), low-pressure air 116 (approximately 50 PSI) must expand the bladder sleeve 160.

During use, delivery of the low-pressure air 116 to the inner air-spaced 170 is repeated, continued, and discontinued (called inflation/deflation cycles) to create a plurality of squeezing, milking-like movements against the teat 5. When delivery of the low-pressure air 116 is discontinued, the low-pressure air 116 in the inner air space 170 slowly escapes from the inner air space 170 via the exhaust port 171. Because the circular recessed channel 174 is formed in the inside surface of the bladder frame 150 that communicates with the exhaust hole 172, any air blocked by the collapsing bladder sleeve 160 may escape through the exhaust hole 172.

Delivery of the low-pressure air 116 is controlled by the PCL 92 and the modified software program 96. As shown in FIG. 19, the control unit 90 is connected to a fourth solenoid 132 that is connected to a low-pressure air source 135 (approximately 50 PSI). It should be understood that the fourth solenoid 132 may be connected to high-pressure air source 113 and configured to lower the air pressure from 150 PSI to approximately 50 PSI. A conduit 133 runs from the fourth solenoid 132 to the handpiece 12 and the air outlet conduit 156 inside the handpiece 12 and then to the bladder frame 150.

Operation of Stripping Embodiment

The washing stage and drying stage used in this embodiment is identical to the washing and drying stages used in the first two embodiments shown in FIG. 1-18. The only difference is that in the third embodiment, is the ability to strip the teat 5 after applying the pre-dip solution 121.

Immediately after the drying step in the pre-dip application stage is completed, the software program 95 and PCL 92 automatically begin a stripping mode that involves opening and closing the fourth solenoid 132 connected to the lower pressure source 135 or the high-pressurized air source 113. The fourth solenoid 132 connects to an external conduit 133, connecting to an air outlet conduit 156 inside the handpiece 12. The air outlet conduit 156 connects to the inner air space 170. Air escapes from the inner air space 170 via the exhaust port 171.

The cyclic, ON/OFF operation of the fourth solenoid 132 is controlled by the PCL 90 and the software program 95. During the stripping stage, 3 to 4 inflation and deflation cycles are performed. Each cycle delivers low pressurized air 116 to the inner air space 170 for approximately 0.5 seconds, followed by a discontinuation period of approximately 0.5 seconds, which enables the low pressurized air 116 to escape. After the stripping step has been completed, the operator then moves the mode switch 21 to the second mode operation position. When the operator then presses the trigger 25, the PCL 92 is activated and runs the post-dip application mode routine, which opens the first solenoid 112 (high-pressure air). When trigger 25 is released, the third solenoid 124 opens to deliver post-dip solution 127 to the nozzles 80. When the trigger 25 is released, the first solenoid 112 remains open for 0.25 to (0.5) seconds, allowing high-pressure air 115 to be released from the nozzles 80 and mixed with the post-dip solution 127 and atomize the last volume of post-dip solution 127 exiting the nozzles 80. The third solenoid 124 remains open 0.25 to 0.5 sec after the first solenoid 112 closes so the entire teat 5 is wetted with a layer of post-dip solution 127.

In summary, the above system 8 uses high-pressure air delivered to a handpiece 12 to apply a pre-dip solution 121 and a post-dip solution 127 to a teat 5. The handpiece 12 includes a spray cylinder 62 or a stripping spray cylinder 130 with nozzles 80 to evenly spray high-pressure air 115, the pre-dip solution 121, and post-dip solution 127 around the teat 5. Below the spray cylinder, 62 or the stripping spray cylinder 130 is a venturi-generated device that creates a vacuum that draws and stretches the teat 5 inside the teat receiving body. System 8 can also be easily modified to include a stripping feature that strips the teat 5 before applying the post-dip solution 127.

Robotic System Embodiment

The above system described system uses a handpiece that allows for manual teat preparation. However, the above system can be modified for robotic implementation. For robotic implementation, the handpiece is removed and replaced by a robotic arm system 400 that requires the use of the teat receiving body 200 containing of one of the spray cylinders 250 described above. The teat receiving body 200 is connected to a control unit that controls the sequential flow of high-pressure air, pre-dip solution and post-dip solution to the teat receiving body 200.

The robotic arm system 400, shown in FIGS. 31-35, includes a rotating support arm 410 attached to a motor 414. The motor 414 is mounted to a rotating platform 418. The motor and support arm 410 are configured so that support arm 410 rotates in a vertical arc of approximately 180 degrees. The rotating platform 418 is configured to rotate in a horizontal arc 180 to 360 degrees.

Mounted to the distal end of the rotating support arm 410 is a second support arm 402 configured to rotate in a horizontal arc of 180 to 360 degrees. Mounted on the distal end of the second support arm 402 is a pivoting arm 406 configured to rotate from the distal end of the second support arm 402 in a vertical arc of 180 degrees. Mounted on the outer end surface of the pivoting arm 406 are two teat receiving bodies 200.

Figure 32:
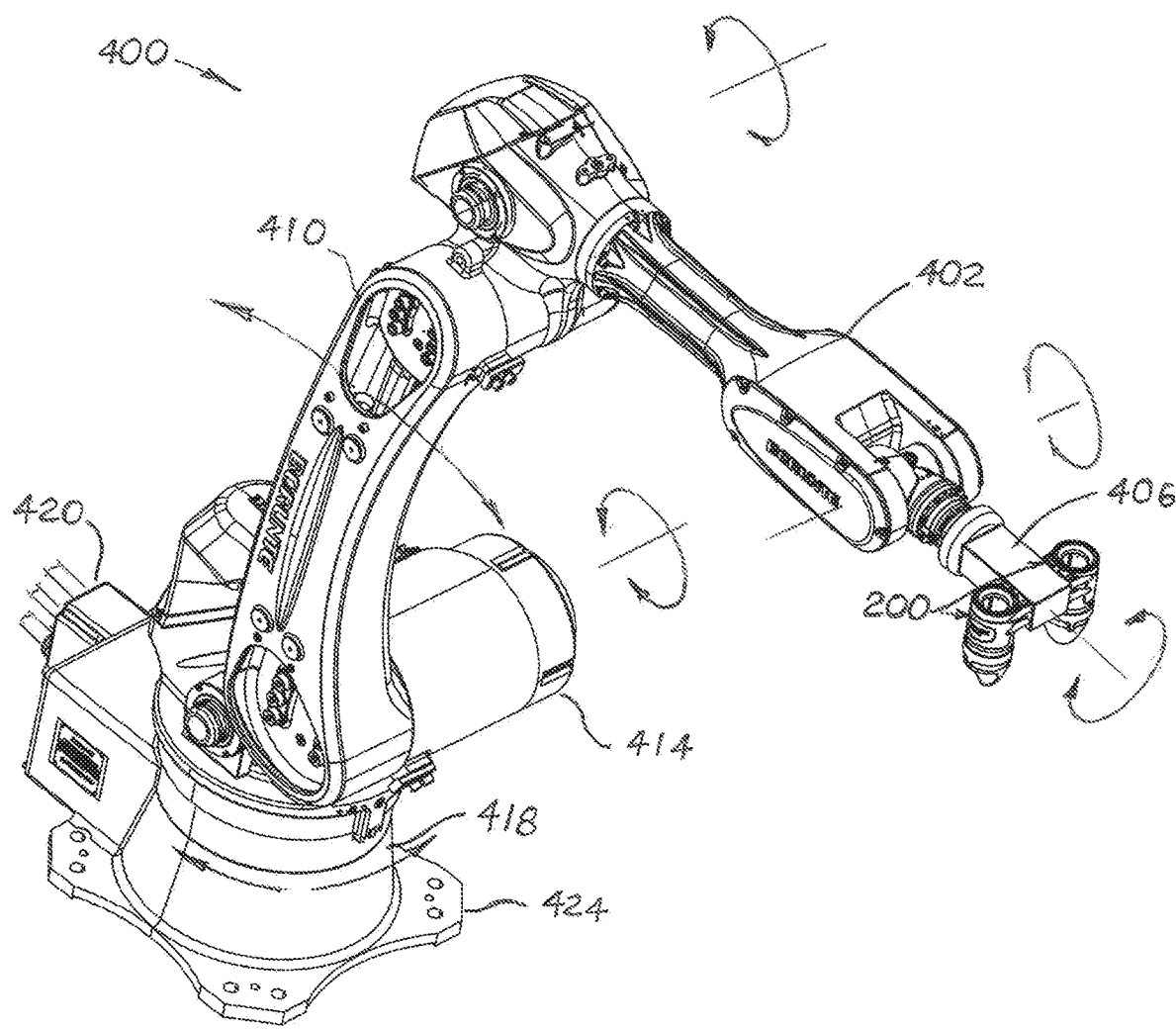
FIG. 32 is a perspective view of a robotic head assembly with two teat receiving bodies attached to a single support arm.

FIG. 32 is a perspective view of a robotic head assembly 400 with two teat receiving bodies attached to opposite sides of a single support arm 406.

Figure 33:
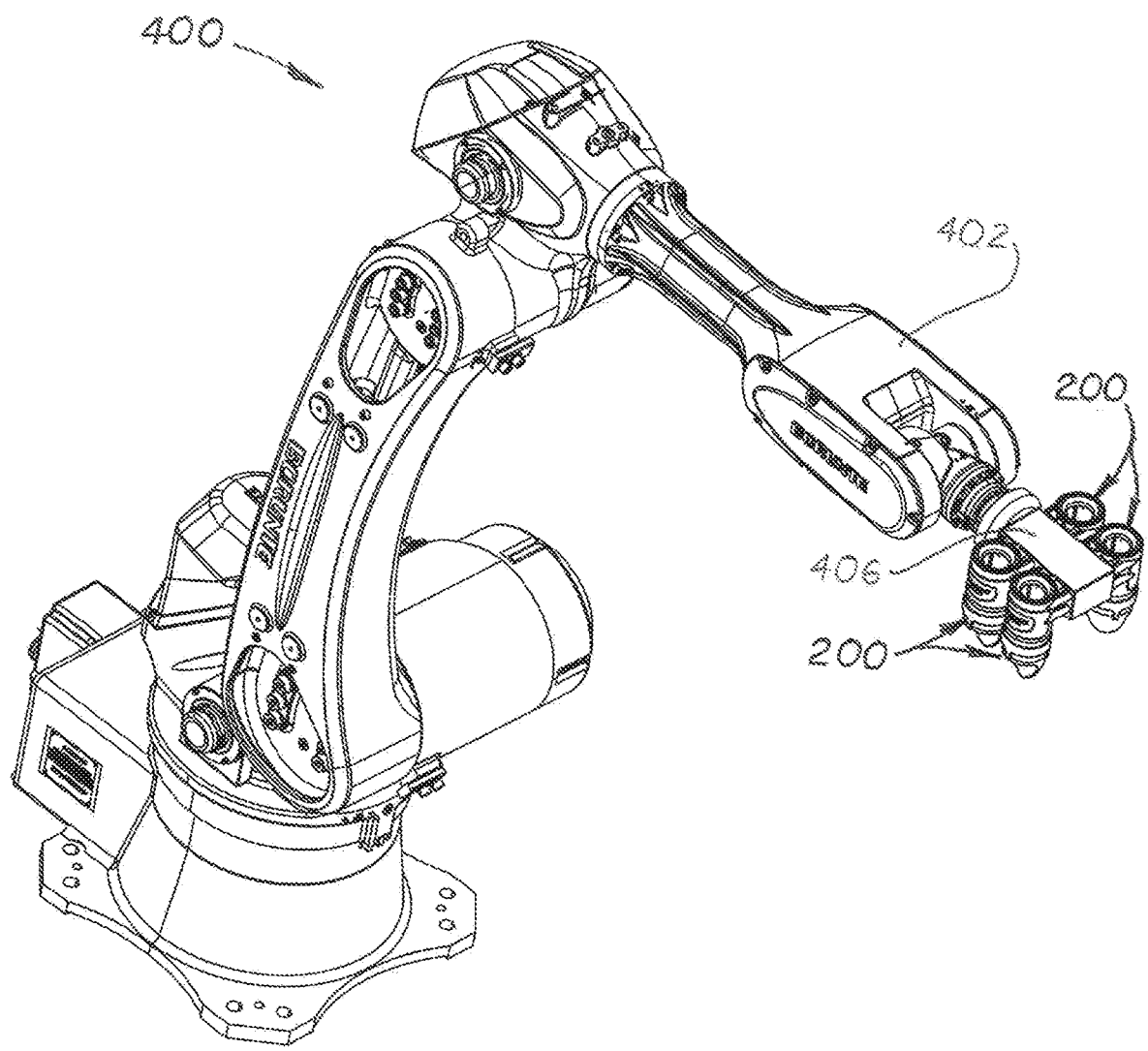
FIG. 33 is a perspective view of a robotic head assembly with four teat receiving bodies attached to a single support arm.

FIG. 33 is a perspective view of a robotic head assembly 400 with four teat receiving bodies 200 attached to a single support arm 406.

Figure 34:
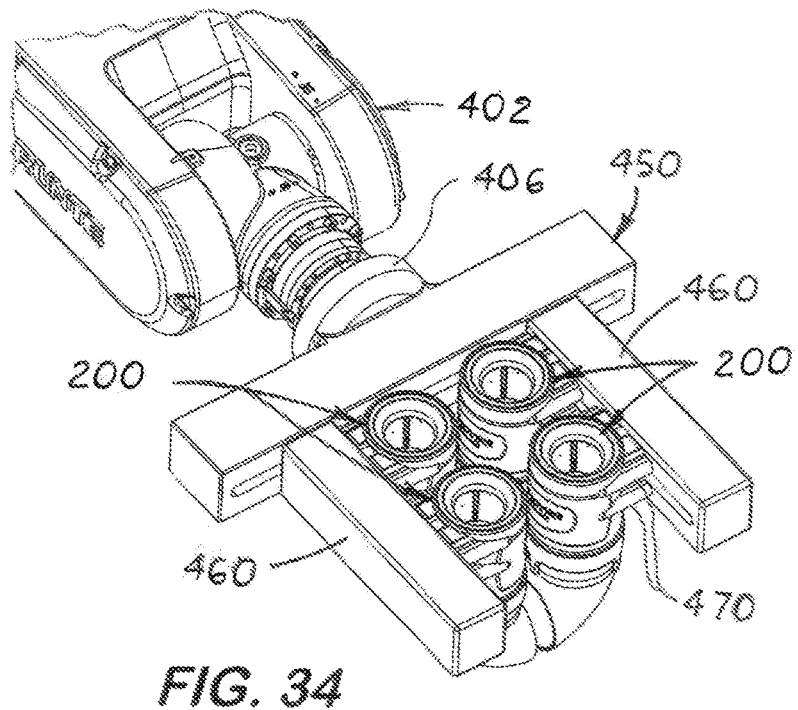
FIG. 34 is a partial perspective of a robotic head assembly that uses four teat receiving bodies attached to two moveble mounting arms that are perpendicularly aligned to an alignment arm attached to the single support arm and moved to a narrow configuration n.
Figure 35:
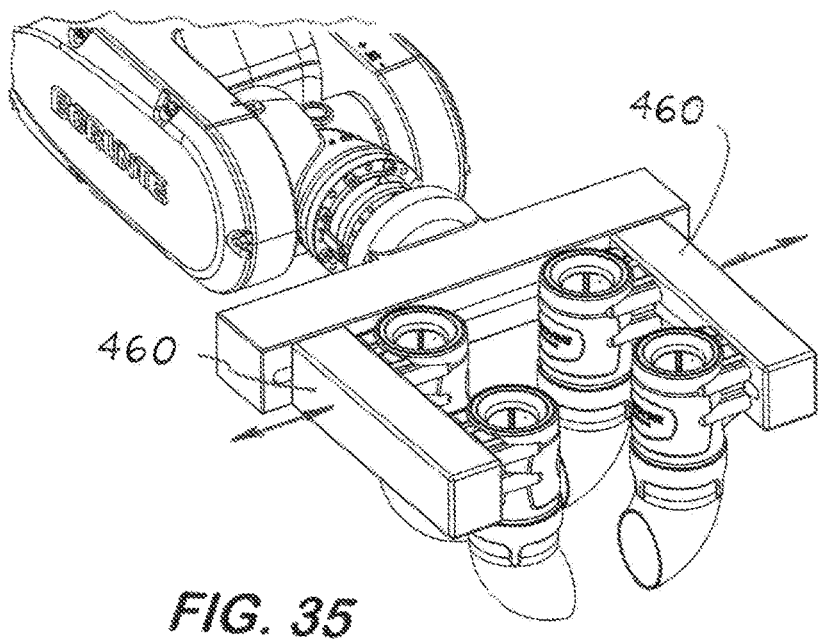
FIG. 35 is a partial perspective of a robotic head assembly similar to the robotic head assembly shown in FIG. 34 showing the mounting arms in a wide configuration.

FIG. 34 is a partial perspective of the second support arm 402 used with the robotic head assembly also uses four teat receiving bodies 200 attached to two moveble mounting arms 460 that are perpendicularly aligned to a transversely oriented alignment arm 450. Each alignment arm 450 is mounted on the end of a short support arm 406. The mounting arms 460 are perpendicularly aligned and extend outward from the alignment arm 450. The mounting arms 460 are also moveable along the alignment arm 450, enabling the system to adjust the spacing between the teat receiving bodies 200. Each teat receiving body 200 is attached to two rods 470 that connect to a mounting arm 460. FIG. 34 also shows the mounting arms 460 in a narrow configuration and FIG. 35 shows the mounting arms 460 in a wide configuration.

Figure 36:
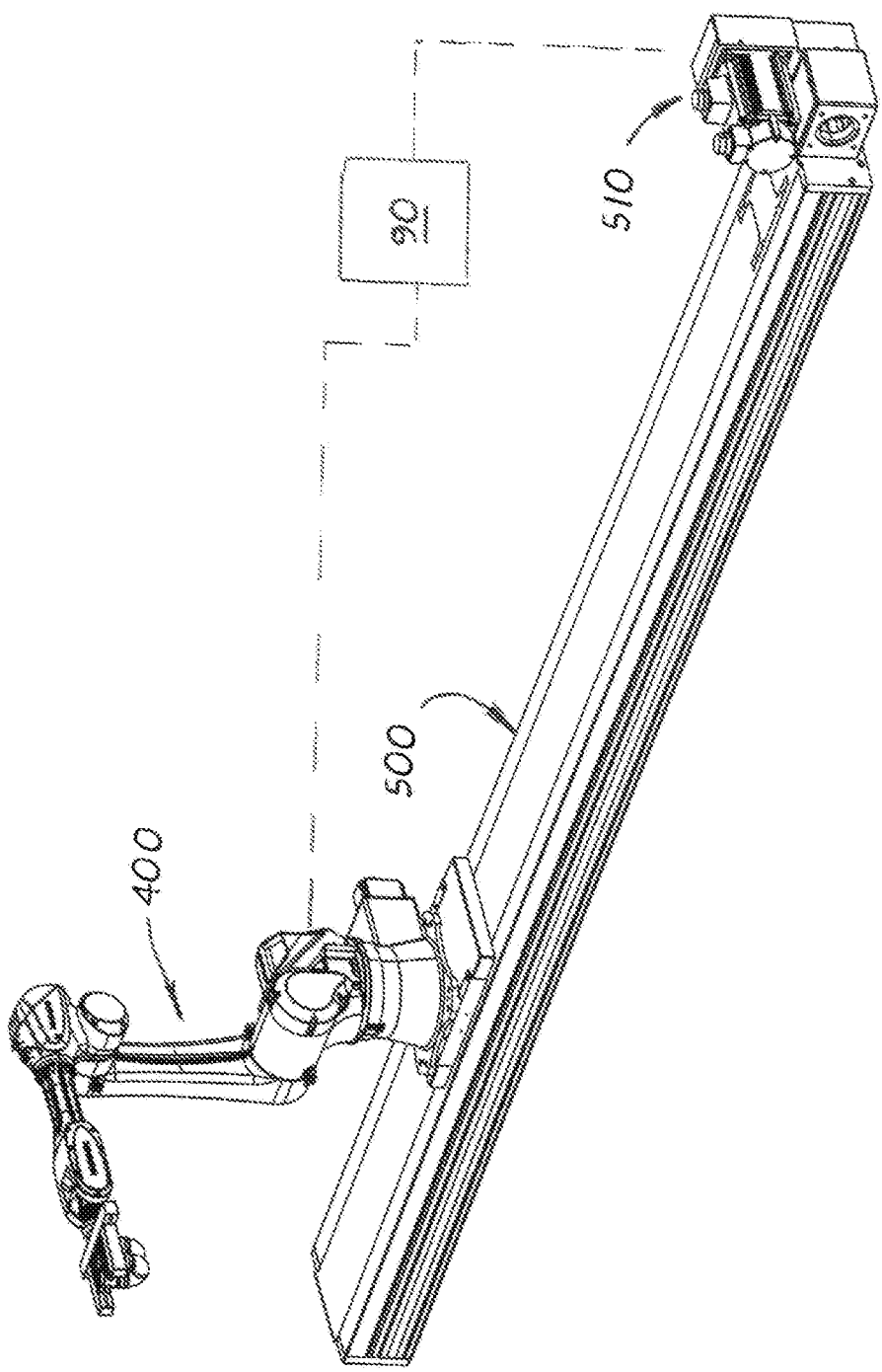
FIG. 36 is a perspective view of the robotic multiple head assembly mounted on a track that enables the head assembly to move longitudinally over the track.

FIG. 36 is a perspective view of the robotic arm system 400 mounted on track 500 with a track control unit 510 connected to track 500. The track control unit 510 controls the movement of the robotic arm system 400 along the track, the movement of the platform 418, arms 402, 406, 410, 450, and 460. The control unit 510 may be connected with the main control unit 90 which controls the delivery of the high-pressure air, pre-dip solution and post dip solution.

In compliance with the statute, the invention described has been described as more or less specific to structural features. It should be understood, however, that the invention is not limited to the specific features shown, since the means and construction is shown, comprises the preferred embodiments for putting the invention into effect. The invention is therefore, claimed in its forms or modifications within the legitimate and valid scope of the amended claims, appropriately interpreted under the doctrine of equivalents.

We claim:

1. A teat preparation apparatus, comprising:
   a. a holder;
   b. a teat receiving body mounted to said holder, said teat receiving body including sidewalls that form a center bore, and a high-pressure air port that connects to a high-pressure air conduit, a pre-dip port that connects to a pre-dip conduit and a post-dip port that connects to a post-dip conduit, said high-pressure air port being located above said pre-dip port and said post-dip port;
   c. a spray cylinder located inside said center bore in said teat receiving body, said spray cylinder including sidewalls that form a central bore configured to fit around a teat, said sidewalls of said spray cylinder configured to form an upper raceway that communicates with said high-pressure air port, said sidewalls also configured to form at least one lower raceway located below and isolated from said upper raceway that communicates with said pre-dip port or said post-dip port;
   d. a first set of nozzles formed on said spray cylinder adjacent to said upper raceway configured to deliver said high-pressure air to said central bore; and
   e. a second set of nozzles formed on said spray cylinder adjacent to said lower raceway configured to deliver said pre-dip solution or said post-dip solution to said central bore.

2. The teat preparation apparatus, as recited in claim 1, further including a plurality of o-rings disposed around said spray cylinder, at least one said o-ring being located between said upper raceway and said lower raceway to prevent high-pressure air from flowing into said lower raceway and to prevent said pre-dip solution or said post-dip solution delivered to said lower raceway from flowing into said upper raceway.

3. The teat preparation apparatus, as recited in claim 2, wherein said holder is a handpiece connected to said teat receiving body.

4. The teat preparation apparatus, as recited in claim 2, further including a deflector cap extending downward from said teat receiving body.

5. The teat preparation apparatus, as recited in claim 4, further including a diffuser inside said deflector cap.

6. The teat preparation apparatus, as recited in claim 5, further including an agitator attached to said diffuser configured to disrupt the downward flow of said high-pressure air, said pre-dip solution or said post-dip solution through said deflector cap.

7. The teat preparation apparatus, as recited in claim 1, wherein said second set of nozzles is angled upward.

8. The teat preparation apparatus, as recited in claim 1, further including an intermediate raceway being located between said upper raceway and said lower raceway, said intermediate raceway communicating with said pre-drip port or said post-drip port.

9. The teat preparation apparatus, as recited in claim 8, further including a third set of nozzles located adjacent to said intermediate raceway configured to deliver said pre-dip solution or said post-dip solution to said central bore.

10. The teat preparation apparatus, as recited in claim 9, wherein said holder is a handpiece connected to said teat receiving body.

11. The teat preparation apparatus, as recited in claim 8, further including at plurality of o-ring disposed around said spray cylinder, at least one said o-ring located between said upper raceway and said second raceway and at least one second o-ring located between said lower raceway and said intermediate raceway.

12. The teat preparation apparatus, as recited in claim 8, further including a control unit connected to a high-pressure air source, to a pre-dip solution source, and to a post-dip solution source, said control unit configured to control the flow of high-pressure air from said high-pressure air source to said high-pressure port, and control the flow of pre-dip solution from said pre-dip post-dip solution source to said pre-dip port, and control the flow of post-dip solution from said post-dip source to said post-dip port.

13. The teat preparation apparatus, as recited in claim 1, further including a deflector cap extending downward from said teat receiving body.

14. The teat preparation apparatus, as recited in claim 13, further including a diffuser inside said deflector cap.

15. The teat preparation apparatus, as recited in claim 14, further including an agitator attached to said diffuser configured to disrupt the downward flow of said high-pressure air, said pre-dip solution or said post-dip solution through said deflector cap.

16. The teat preparation apparatus, as recited in claim 1, further including a control unit connected to a high-pressure air source, to a pre-dip solution source, and to a post-dip solution source, said control unit configured to control the flow of high-pressure air from said high-pressure air source to said high-pressure port, and control the flow of pre-dip solution from said pre-dip post-dip solution source to said pre-dip port, and control the flow of post-dip solution from said post-dip source to said post-dip port.

17. The teat preparation apparatus, as recited in claim 1, wherein said holder is a robotic arm control apparatus that selectively adjusts the positioning of said spray cylinder so that said central bore is positioned around a teat.

18. The teat preparation apparatus, as recited in claim 17, wherein said robotic arm control apparatus is mounted on a track and selectively moves over said track.

19. The teat preparation apparatus, as recited in claim 1, wherein said teat receiving body is mounted on a support member attached to said robotic arm control apparatus.

20. The teat preparation apparatus, as recited in claim 19, further including a second teat receiving body mounted on said support member.

21. The teat preparation apparatus, as recited in claim 20, wherein said teat receiving body and a second teat receiving body are adjustable to simultaneously fit around two teats on an utter.

* * * * *